(12) United States Patent
Sanchez et al.

(10) Patent No.: US 12,407,863 B2
(45) Date of Patent: Sep. 2, 2025

(54) MERGING FRIENDLY FILE FORMAT

(71) Applicant: FRAUNHOFER-GESELLSCHAFT ZUR FÖRDERUNG DER ANGEWANDTEN FORSCHUNG E.V., Munich (DE)

(72) Inventors: Yago Sanchez, Berlin (DE); Dimitri Podborski, Berlin (DE); Karsten Grüneberg, Berlin (DE); Cornelius Hellge, Berlin (DE); Thomas Schierl, Berlin (DE); Robert Skupin, Berlin (DE); Thomas Wiegand, Berlin (DE)

(73) Assignee: Fraunhofer-Gesellschaft zur Forderung der Angewandlen Forschung EV, Munich (DE)

( * ) Notice: Subject to any disclaimer, the term of this patent is extended or adjusted under 35 U.S.C. 154(b) by 240 days.

(21) Appl. No.: 17/763,260

(22) PCT Filed: Sep. 28, 2020

(86) PCT No.: PCT/EP2020/077035
§ 371 (c)(1),
(2) Date: Mar. 24, 2022

(87) PCT Pub. No.: WO2021/058814
PCT Pub. Date: Apr. 1, 2021

(65) Prior Publication Data
US 2022/0345746 A1    Oct. 27, 2022

(30) Foreign Application Priority Data

Sep. 27, 2019 (EP) .................... 19200237

(51) Int. Cl.
*H04N 19/70* (2014.01)
*H04N 19/167* (2014.01)
(Continued)

(52) U.S. Cl.
CPC .......... *H04N 19/70* (2014.11); *H04N 19/167* (2014.11); *H04N 19/174* (2014.11);
(Continued)

(58) Field of Classification Search
CPC .... H04N 19/70; H04N 19/167; H04N 19/174; H04N 19/188; H04N 19/33;
(Continued)

(56) References Cited

U.S. PATENT DOCUMENTS

| 2018/0277164 A1* | 9/2018 | Wang ................. H04N 21/2353 |
| 2019/0174161 A1* | 6/2019 | Skupin ................. H04N 19/167 |
| 2020/0260063 A1 | 8/2020 | Hannuksela | |

FOREIGN PATENT DOCUMENTS

| TW | 201733355 A * | 9/2017 | ............. H04L 65/75 |
| WO | 2015012227 | 1/2015 | |

(Continued)

OTHER PUBLICATIONS

Motion Picture Expert Group, "Preliminary WD of ISO/IEC 23090-2 2nd edition OMAF," 127 MPEG Meeting; Jul. 8, 2019-Jul. 2, 2019; Gothenburg (Aug. 16, 2019).

*Primary Examiner* — Thai Q Tran
*Assistant Examiner* — Nienru Yang
(74) *Attorney, Agent, or Firm* — PRICE HENEVELD LLP

(57) ABSTRACT

Video data for deriving a spatially variable section of a scene therefrom as well as corresponding methods and apparatuses for creating video data for deriving a spatially variable section of a scene therefrom and for deriving a spatially variable section of a scene from video data. The video data comprises a set of source tracks comprising coded video data representing spatial portions of a video showing the scene and is formatted in a specific file format and supports (Continued)

the merging of different spatial portions into a joint bitstream through compressed-domain processing.

8 Claims, 13 Drawing Sheets

(51) Int. Cl.
    *H04N 19/169* (2014.01)
    *H04N 19/174* (2014.01)
    *H04N 19/33* (2014.01)
    *H04N 19/597* (2014.01)
    *H04N 21/854* (2011.01)

(52) U.S. Cl.
    CPC ........... *H04N 19/188* (2014.11); *H04N 19/33* (2014.11); *H04N 19/597* (2014.11); *H04N 21/85406* (2013.01)

(58) Field of Classification Search
    CPC ........... H04N 19/597; H04N 21/85406; H04N 21/23439; H04N 21/4728; H04N 5/932; H04N 5/935; H04N 13/183; H04N 13/332; H04N 19/463; H04N 21/4621; H04N 21/8543
    USPC ........................................................ 386/248
    See application file for complete search history.

(56) References Cited

FOREIGN PATENT DOCUMENTS

| | | |
|---|---|---|
| WO | 2016006431 | 1/2016 |
| WO | 2019002662 | 1/2019 |
| WO | 2019072795 | 4/2019 |

\* cited by examiner

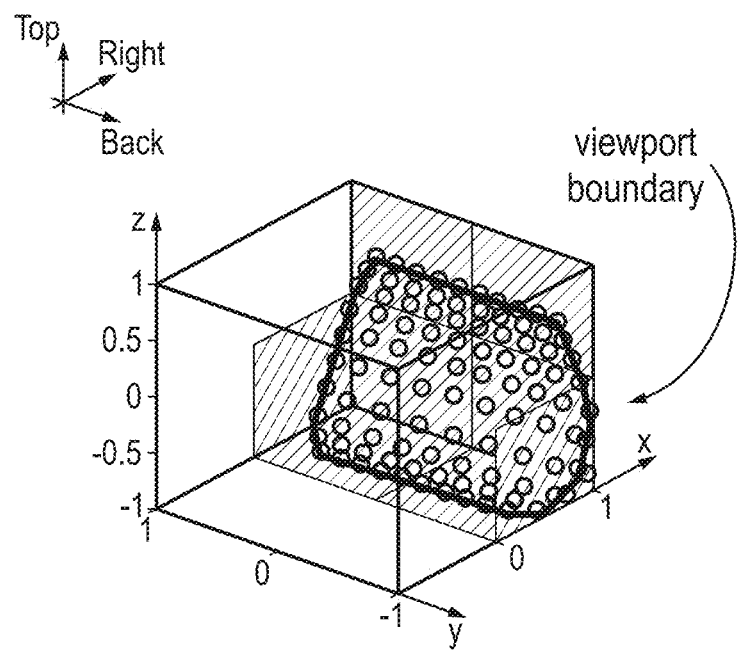
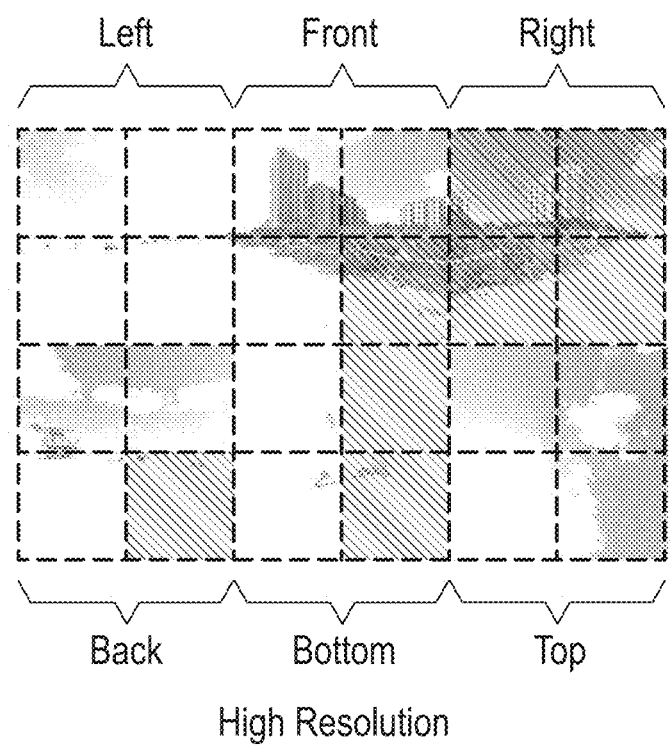
High Resolution
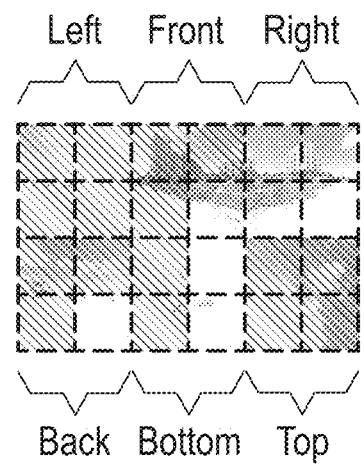
Low Resolution
Fig. 2

| | | Descriptor |
|---|---|---|
| 1 | pic_parameter_set_rbsp( ) { | |
| 2 | pps_pic_parameter_set_id | ue(v) |
| 3 | pps_seq_parameter_set_id | ue(v) |
| 4 | [...] | |
| 5 | single_tile_in_pic_flag | u(1) |
| 6 | if( !single_tile_in_pic_flag ) { | |
| 7 | uniform_tile_spacing_flag | u(1) |
| 8 | if( uniform_tile_spacing_flag ) { | |
| 9 | tile_cols_width_minus1 | ue(v) |
| 10 | tile_rows_height_minus1 | ue(v) |
| 11 | } else { | |
| 12 | num_tile_columns_minus1 | ue(v) |
| 13 | num_tile_rows_minus1 | ue(v) |
| 14 | for( i = 0; i < num_tile_columns_minus1; i++ ) | |
| 15 | tile_column_width_minus1[ i ] | ue(v) |
| 16 | for( i = 0; i < num_tile_rows_minus1; i++ ) | |
| 17 | tile_row_height_minus1[ i ] | ue(v) |
| 18 | } | |
| 19 | brick_splitting_present_flag | u(1) |
| 20 | if( uniform_tile_spacing_flag && brick_splitting_present_flag ) | |
| 21 | num_tiles_in_pic_minus1 | ue(v) |
| 22 | for( i = 0; brick_splitting_present_flag && i <= num_tiles_in_pic_minus1 + 1; i++ ) { | |
| 23 | if( RowHeight[ i ] > 1 ) | |
| 24 | brick_split_flag[ i ] | u(1) |
| 25 | if( brick_split_flag[ i ] ) { | |

| | |
|---|---|
| 26  if( RowHeight[ i ] > 2 ) | |
| 27    uniform_brick_spacing_flag[ i ] | u(1) |
| 28    if( uniform_brick_spacing_flag[ i ] ) | |
| 29      brick_height_minus1[ i ] | ue(v) |
| 30    else { | |
| 31      num_brick_rows_minus2[ i ] | ue(v) |
| 32      for( j = 0; j <= num_brick_rows_minus2[ i ]; j++ ) | |
| 33        brick_row_height_minus1[ i ][ j ] | ue(v) |
| 34    } | |
| 35  } | |
| 36  single_brick_per_slice_flag | u(1) |
| 37  if( !single_brick_per_slice_flag ) | |
| 38    rect_slice_flag | u(1) |
| 39  if( rect_slice_flag && !single_brick_per_slice_flag ) { | |
| 40    num_slices_in_pic_minus1 | ue(v) |
| 41    bottom_right_brick_idx_length_minus1 | ue(v) |
| 42    for( i = 0; i <= num_slices_in_pic_minus1; i++ ) { | |
| 43      if( i > 0 ) | |
| 44        top_left_brick_idx[ i ] | u(v) |
| 45      bottom_right_brick_idx_delta[ i ] | u(v) |
| 46      brick_idx_delta_sign_flag[ i ] | u(1) |
| 47    } | |
| 48  } | |
| 49  loop_filter_across_bricks_enabled_flag | u(1) |

Fig. 5B

| | Descriptor |
|---|---|
| 51    if( loop_filter_across_bricks_enabled_flag ) | |
| 52      loop_filter_across_slices_enabled_flag | u(1) |
| 53    } | |
| 54    if( rect_slice_flag ) { | |
| 55      signalled_slice_id_flag | u(1) |
| 56      if( signalled_slice_id_flag ) { | |
| 57        signalled_slice_id_length_minus1 | ue(v) |
| 58        for( i = 0; i <= num_slices_in_pic_minus1; i++ ) | |
| 59          slice_id[ i ] | u(v) |
| 60        } | |
| 61      } | |
| 62    [...] | |
| 63 } | |

| | Descriptor |
|---|---|
| 1 slice_header( ) { | |
| 2    slice_pic_parameter_set_id | ue(v) |
| 3    if( rect_slice_flag \|\| NumBricksInPic > 1 ) | |
| 4      slice_address | u(v) |
| 5    if( rect_slice_flag && !single_brick_per_slice_flag ) | |
| 6      num_bricks_in_slice_minus1 | ue(v) |
| 7    [...] | |
| 8 } | |

Fig. 5C

```xml
<?xml version="1.0"?>
<xs:schema xmlns:xs="http://www.w3.org/2001/XMLSchema"
xmlns:xlink="http://www.w3.org/1999/xlink" xmlns="..." targetNamespace="..."
elementFormDefault="qualified" attributeFormDefault="unqualified">
    <xs:annotation>
        <xs:appinfo>VVC Parameter Set Template</xs:appinfo>
        <xs:documentation xml:lang="en">This Schema defines the Template of
Parameter Sets for VVC.</xs:documentation>
    </xs:annotation>
    <!-- define types from vvc spec -->
    <xs:simpleType name="VVCCodingType">
        <xs:restriction base="xs:string">
            <xs:enumeration value="aev"/>
            <xs:enumeration value="uev"/>
            [...]
            <!--or use regular expressions <xs:pattern value="fancyRegExp"/> -->
        </xs:restriction>
    </xs:simpleType>
    <xs:complexType name="SliceIDTemplateType">
        <xs:attribute name="slice_id" type="xs:string"/>
        <xs:attribute name="index" type="xs:integer"/>
    </xs:complexType>
    <!-- VVCParameterSets: main element -->
    <xs:element name="VVCParameterSets" type="VVCParameterSetsType"/>
    <xs:complexType name="VVCParameterSetsType">
        <xs:sequence>
            <xs:element name="ParameterSetTemplate"
type="ParameterSetTemplateType" minOccurs="1" maxOccurs="unbounded"/>
        </xs:sequence>
```

Fig. 6

| Fig. 6A |
|---|
| Fig. 6B |
| Fig. 6C |

Fig. 6A

```
        <xs:attribute name="id" type="xs:string"/>
        <!-- define more attributes and elements -->
        [...]
    </xs:complexType>
    <!-- ParamSetTemplate: element -->
    <xs:complexType name="ParameterSetTemplateType">
        <xs:element name="VPS" type="VPSType" minOccurs="1" maxOccurs="1"/>
        <xs:element name="PPS" type="PPSType" minOccurs="1" maxOccurs="1"/>
        <xs:element name="SPS" type="SPSType" minOccurs="1" maxOccurs="1"/>
        <!-- optional element for tiling layout -->
        <xs:element name="TilingLayout" type="TilingLayoutType" minOccurs="0" maxOccurs="1"/>
        <xs:attribute name="id" type="xs:string"/>
        <!-- define more attributes and elements -->
        [...]
    </xs:complexType>
    <!-- VPS -->
    <xs:complexType name="VPSType">
        <xs:attribute name="vps_parameter_set_id" type="xs:integer" use="required"/>
        <xs:attribute name="vps_max_layers_minus1" type="xs:integer" use="required"/>
        [...]
    </xs:complexType>
    <!-- SPS -->
    <xs:complexType name="SPSType">
        <xs:attribute name="sps_decoding_parameter_set_id" type="xs:integer" use="required"/>
        <xs:attribute name="sps_video_parameter_set_id" type="xs:integer" use="required"/>
        [...]
```

Fig. 6B

```
    </xs:complexType>
<!-- PPS -->
<xs:complexType name="PPSType">
    <!-- all flags are defined as attributes -->
    <xs:attribute name="pps_pic_parameter_set_id" type="xs:integer" use="required"/>
    <xs:attribute name="pps_seq_parameter_set_id" type="xs:integer" use="required"/>
    [...]
    <xs:attribute name="single_tile_in_pic_flag" type="xs:boolean" use="required"/>
    [...]
    <xs:attribute name="single_brick_per_slice_flag" type="xs:boolean"/>
    <xs:attribute name="rect_slice_flag" type="xs:boolean"/>
    <xs:attribute name="signalled_slice_id_flag" type="xs:boolean"/>
    [...]
    <!-- if( signalled_slice_id_flag ) -->
    <xs:attribute name="signalled_slice_id_length_minus1" type="xs:integer"/>
    <xs:sequence>
        <xs:element name="SliceIDTemplate" type="SliceIDTemplateType" minOccurs="0"/>
    </xs:sequence>
    [...]
</xs:complexType>
    [...]
</xs:schema>
```

Fig. 6C

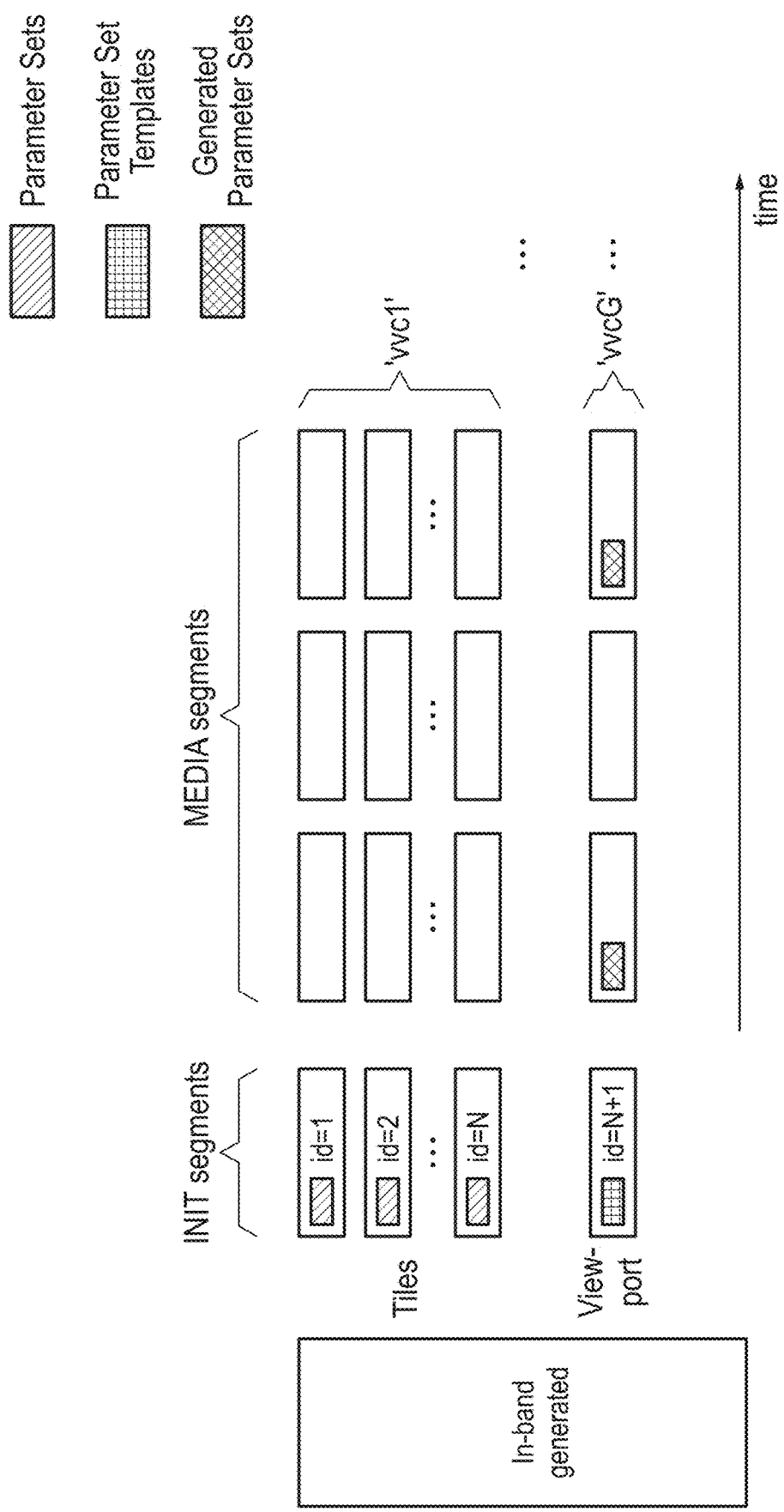

MERGING FRIENDLY FILE FORMAT

CROSS-REFERENCE TO FOREIGN PRIORITY APPLICATION

The present application claims the benefit under 35 U.S.C. §§ 119(b), 119(e), 120, and/or 365(c) of PCT/EP2020/077035 filed Sep. 28, 2020, which claims priority to European Application No. EP 19200237.6 filed Sep. 27, 2019.

FIELD OF THE INVENTION

The present application is concerned with a file format that allows for the extraction or merging of spatial subsets of coded videos using compressed domain processing. In particular, the present application is concerned with video data for deriving a spatially variable section of a scene therefrom, methods and apparatuses for creating video data for deriving a spatially variable section of a scene therefrom, and methods and apparatuses for deriving a spatially variable section of a scene from video data, wherein the video data is formatted in a specific file format. The present application is also concerned with corresponding computer programs, computer-readable media and digital storage media.

BACKGROUND OF THE INVENTION

1. Introduction

Coded video data, such as data video coded with AVC (Advanced Video Coding), HEVC (High Efficiency Video Coding), or the currently developed VVC (Versatile Video Coding), is typically stored or transmitted in particular container formats, for instance, the ISO base media file format and its various extensions as specified in ISO/IEC 14496-12 (Coding of audio-visual objects—Part 12: ISO base media file format), ISO/IEC 14496-15 (Coding of audio-visual objects—Part 12: Carriage of network abstraction layer (NAL) unit structured video in the ISO base media file format), ISO/IEC 23008-12 (High efficiency coding and media delivery in heterogeneous environments—Part 12: Image File Format), et cetera. Such container formats include special provisions that are targeted at applications that rely on compressed domain processing for extraction or merging of spatial subsets of coded videos, for instance, for the purpose of using a single decoder on the end device. A non-exhaustive list of examples of such applications is as follows:
- region-of-interest (RoI) streaming: in which a varying spatial subset of a video is transmitted;
- multi-party conferencing: in which coded video streams from multiple participants are to be decoded jointly with a single decoder; or
- tile-based streaming: e.g., for 360-degree video playback in VR applications.

1.1 360-Degree Video Tiled Streaming

In the latter, a 360-degree video of a scene is spatially segmented and each spatial segment is offered to streaming clients in multiple representations of varying spatial resolutions as illustrated in FIG. 1. The figure shows a cube map projected 360-degree video (including a left side, a front side, a right side, a back side, a bottom side, and a top side) divided into 6×4 spatial segments at two resolutions (high resolution and low resolution). For simplicity, these independently decodable spatial segments are referred to as tiles in this description. Depending on the chosen video coding technology, the independent coding of the different spatial segments can be achieved using structures such as tiles, bricks, slices, and so on. For example, if each tile is coded with the currently developed VVC (Versatile Video Coding), it can be achieved by partitioning the pictures using a suitable tile/brick/slice structure, so that, e.g., no intra- or inter-prediction is performed between different tiles/bricks of a same or different pictures. For example, each independently decodable spatial segment may be coded using a single tile as a separate slice, or it may further use the concept of bricks for a more flexible tiling.

A user typically watches only a subset of the tiles constituting the entire 360-degree video when using state-of-the-art head-mounted-displays (HMDs) as illustrated at the top of FIG. 2 through a solid viewport boundary representing a field of view (FoV) of 90×90 degrees. The corresponding tiles (in this example, the four tiles of the right side, two tiles of the bottom side, one tile of the front side and one side of the back side), illustrated as shaded at the top of FIG. 2, are downloaded at the highest resolution (also shown with a shading at the bottom left of the Figure).

However, the client application will also have to download and decode a representation of the other tiles (not shaded at the top of FIG. 2) outside the current viewport, shown with a different shading at the bottom right FIG. 2, in order to handle sudden orientation changes of the user. A client in such an application would thus download tiles that cover its current viewport in the highest resolution and tiles outside its current viewport in a comparatively lower resolution while the selection of tile resolutions is constantly adapted to the orientation of the user. After the download on the client side, merging the downloaded tiles into a single bitstream to be processed with a single decoder is a means to address the constraints of typical mobile devices with limited computational and power resources. FIG. 3 illustrates a possible tile arrangement in a joint bitstream for the above examples. The merging operation to generate a joint bitstream has to be carried out through compressed-domain processing on the bitstream level in order to avoid complex processing in the pixel-domain such as transcoding or decoding separate tiles independently from each other before synchronously rendering them on a cube.

A metadata description in the coded video bitstream in the form of so-called supplemental enhancement information (SEI) messages describes how samples of the coded picture relate to positions in the original projection (e.g., cube map in the example) in order to allow reconstruction of the cube (or sphere depending on the used projection) in 3D space. This metadata description, referred to as region-wise-packing (RWP), is vital for a post-decoding renderer that renders a viewport for a media consumption device such as a head-mounted display (HMD). The RWP SEI message gives a mapping from the projected video (e.g., as given on the left-hand side of FIG. 1 and conceptionally needed for further processing after decoding) and the packed coded video of one specific combination (as given in FIG. 3 or at the right-hand side of FIG. 4 resulting from decoding the combined bitstream) by defining rectangular regions and their displacement/transformation between projected and packed video.

While the example from FIG. 1 to FIG. 3 illustrates the case where content at all resolution versions is similarly tiled, all tiles (high resolution and low resolution) cover the entire 360-degree space and no tiles repeatedly cover the same region, an alternative tiling can also be used as illustrated in FIG. 4. The entire low resolution version of the video can be merged with high-resolution tiles covering a subset of the 360-degree video. The entire low resolution fallback video can be encoded as a single tile, while the high resolution tiles are rendered as an overlay of the low resolution part of the video at the final stage of the rendering process.

1.2 Issues with Tiled Streaming Using HEVC and File Format

For codecs such as HEVC, the necessities for merging operations from a video bitstream perspective are related to the tiling structure of pictures and the CTU (coding tree unit) address signaling of the individual tiles (i.e., slices). On the server side these tiles exist (and are hence downloaded) as individual independent HEVC bitstreams, e.g., with a single tile and slice per picture in each of these bitstreams (for instance: first_slice_in_pic_flag equal to 1 in all slice headers, parameter sets describing bitstreams with only a single tile). The merging operation has to join these individual bitstreams into a single bitstream by inserting correct parameter sets and slice headers to reflect the tile structure and positions within the joint picture plane. Apart from leaving the details of the merging (derivation and replacement of parameter sets and slice headers) to the client implementation, the state-of-the-art method for enabling a client to merge bitstreams is specified in MPEG OMAF (Coded representation of immersive media—Part 2: Omnidirectional media format; ISO/IEC 23090-2) through:

generating correct parameter sets and slice headers at the packaging stage, and copying slice payloads by use of a file format tool referred to as extractors.

These extractors are actually NAL units of a special NAL (network abstraction layer) unit type defined in an extension of the file format, namely, in ISO/IEC 14496-15, which contains a pointer to another NAL unit (e.g., containing data of a single tile) packaged in a different track. The extractors themselves are stored in a special extractor file format track ('hvc2' tracks) that carries only parameter sets and modified slice header data (for instance, reflecting the new position of tiles, the adjusted value of the quantization step size with respect to the parameter sets base value, and so on) while the slice payload (i.e., the entropy-coded data that constitutes the actual sample values of a picture when decoded) is referred to by the extractor pointing to a (portion of a) NAL unit in another track and copied when such a file format track is read.

In 360-degree video tile based streaming systems, this extractor tool leads to a design that each tile is typically packaged and offered as an independent HEVC stream in a separate file format track that could be decoded by a conformant HEVC decoder and resulting in the respective spatial subset of the full picture. Further, a set of such extractor tracks is offered, each targeted at a specific viewing direction (i.e., a combination of tiles at a specific resolution, focusing decoding resources such as the sample budget on the tiles in the viewport) that carry out the merging process through the file format tools and result in a single conformant HEVC bitstream containing all necessary tiles when read. A client can select the extractor track that suits its current viewport the most and download the tracks containing the referred tiles.

Each extractor track stores the parameter sets in the HEVCConfigurationBox contained in an HEVCSampleEntry. Those parameter sets are generated in the file format packaging process and are only available in the sample entry, which means that once the client selected an extractor track, the parameter sets are delivered out-of-band (using an initialization segment) and, therefore, the parameter sets cannot change over time while playing the same extractor track. In addition to the required sample entry, initialization segments of extractor tracks also contain a fixed list of dependent trackIDs in a track reference container ('tref'). The extractors (contained in the media segments of the extractor track) contain index values which refer to that 'tref' in order to determine which trackID is referenced by an extractor.

However, this design has numerous drawbacks:

Each viewing direction (or tile combination) is required to be represented through a separate extractor track with explicit references to the included tiles (i.e., tracks), which generates a considerable overhead. A client may be better at selecting tile resolutions (i.e., creating its own combination) better matching its needs (client FoV, delay considerations, and so on). In addition, the data contained in such extractor track is often very similar throughout the timeline (inline and sample constructors remain the same).

Typically, all slice headers need to be adjusted through extractors, which further generates a considerable overhead. This results in a lot of pointers to dependent tracks, which means that a lot of buffer copying needs to be performed, which is especially costly for web applications using JavaScript, for example.

A file format parser cannot resolve an extractor track without all data being completely downloaded beforehand. This can add additional delay to the system, when, for example, all video data (tiles) were downloaded and the client is still waiting for extractor track data to be fetched.

The complexity for common encryption of such extractor tracks increases as partial encryption has to be applied (slice payloads must be encrypted independent of slice headers).

1.3 VVC Design and File Format Implications on Tiled-Streaming

For the next codec generation such as VVC, two main efforts to simplify compressed domain extraction/merging operations were undertaken.

1.3.1 Tiling Syntax in VVC

While in HEVC, the subdivision of pictures into slices (NAL units) was ultimately signaled on the slice header level, i.e., through having multiple slices in a tile or tiles in a slice, in VVC, the subdivision of pictures into slices (NAL units) is described in parameter sets only. A first divisioning level is signaled through tile rows and columns followed by a second divisioning level through so-called brick splits of each tile. Tiles without further brick splitting are also referred to as a single brick. The number of slices per picture and the associated bricks are explicitly indicated in the parameter sets.

1.3.2 Slice Address Signaling in VVC

For instance, former codecs such as HEVC relied on slice position signaling through a slice address in CTU raster scan order in each slice header, specifically first_slice_in_pic_flag and slice_address with a coded length depending on the picture size. Instead of these two syntax elements, VVC features an indirection of these addresses in which, instead of an explicit CTU position, slice headers carry as slice address an identifier (e.g., brick_id, tile_id, or subpic_id) that is mapped to a specific picture position by the associated parameter sets. Thus, when tiles are to be re-arranged in an extraction or merging operation, only the parameter set indirection has to be adjusted instead of each slice header.

1.3.3 VVC Syntax and Semantics

FIG. 5 illustrates related excerpts of the currently envisioned Picture Parameter Set and Slice Header syntax of VVC taken from the VVC specification (Draft 6; Version 11), with line numbers provided before the relevant syntax. The syntax elements in lines 5 to 49 of the Picture Parameter Set syntax are relevant for the tiling structure and the syntax elements in lines 54 to 61 of the Picture Parameter Set syntax and the syntax element slice_address in the Slice header syntax are relevant for the slice/tile positioning.

The semantics of the syntax elements relevant for the slice/tile positioning is as follows:

slice_id[i] specifies the slice ID of the i-th slice. The length of the slice_id[i] syntax element is signalled_slice_id_length_minus1+1 bits. When not present, the value of slice_id[i] is inferred to be equal to i, for each i in the range of 0 to num_slices_in_pic_minus1, inclusive.

slice_address specifies the slice address of the slice. When not present, the value of slice_address is inferred to be equal to 0.

If rect_slice_flag is equal to 0, the following applies:
The slice address is the brick ID as specified by Equation (7-59).
The length of slice_address is Ceil(Log 2 (NumBricksInPic)) bits.
The value of slice_address shall be in the range of 0 to NumBricksInPic−1, inclusive.

Otherwise (rect_slice_flag is equal to 1), the following applies:
The slice address is the slice ID of the slice.
The length of slice_address is signalled_slice_id_length_minus1+1 bits.
If signalled_slice_id_flag is equal to 0, the value of slice_address shall be in the range of 0 to num_slices_in_pic_minus1, inclusive. Otherwise, the value of slice_address shall be in the range of 0 to $2^{(signalled\_slice\_d\_length\_minus1+1)}-1$, inclusive.

It is a requirement of bitstream conformance that the following constraints apply:
The value of slice_address shall not be equal to the value of slice_address of any other coded slice NAL unit of the same coded picture.
When rect_slice_flag is equal to 0, the slices of a picture shall be in increasing order of their slice_address values.
The shapes of the slices of a picture shall be such that each brick, when decoded, shall have its entire left boundary and entire top boundary consisting of a picture boundary or consisting of boundaries of previously decoded brick(s).

The changes of the VVC high-level syntax with respect to the HEVC high-level syntax can be facilitated in design of a future container format integration, e.g., in a future file format extension, which is what this present invention is concerned with. In more detail, the present invention includes aspects that deal with:
basic grouping of source tracks (tracks of tiles) into mergeable sets;
templates for configurable parameter sets and/or SEI messages;
extended grouping for configurable parameter sets and/or SEI messages; and
random access point indications in track combinations.

SUMMARY OF THE INVENTION

According to an aspect of the present invention, video data for deriving a spatially variable section of a scene therefrom is provided, wherein the video data is formatted in a file format and comprises:
a set of two or more source tracks, each of which comprises coded video data representing a spatial portion of a video showing the scene,
wherein the set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks.

According to another aspect of the present invention, video data for deriving a spatially variable section of a scene therefrom is provided, wherein the video data is formatted in a file format and comprises:
a set of two or more source tracks, each of which comprises coded video data representing a spatial portion of a video showing the scene; and
gathering information comprising merge information for merging a sub-set of the set of two or more source tracks in order to generate a section-specific video data stream,
wherein the gathering information further comprises a template for a configurable parameter set and/or SEI message, wherein the template indicates one or more values of the parameter set or the SEI message that need to be adapted to generate a parameter set or SEI message specific for the section-specific video stream.

According to another aspect of the present invention, video data for deriving a spatially variable section of a scene therefrom is provided, wherein the video data is formatted in a file format and comprises:
a set of one or more source tracks comprising coded video data representing spatial portions of a video showing the scene,
wherein the coded video data is coded using random access points and the formatted video data further comprises one or more random access point alignment indicators for indicating whether or not the random access points in the coded video data for all spatial portions are aligned.

According to another aspect of the present invention, a method for creating video data for deriving a spatially variable section of a scene therefrom is provided, wherein the video data is formatted in a file format and comprises:
a set of two or more source tracks, each of which comprises coded video data representing a spatial portion of a video showing the scene,
wherein the set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks,
wherein the method comprises:
determining the groups of source tracks and the number of two or more active source tracks in a group, creating the one or more group indicators and the one or more active source track indicators and writing them to the formatted video data.

According to another aspect of the present invention, a method for creating video data for deriving a spatially variable section of a scene therefrom is provided, wherein the video data is formatted in a file format and comprises:
a set of two or more source tracks, each of which comprises coded video data representing a spatial portion of a video showing the scene; and gathering information comprising merge information for merging a sub-set of the set of two or more source tracks in order to generate a section-specific video data stream,
wherein the gathering information further comprises a template for a configurable parameter set and/or SEI message, wherein the template indicates one or more values of the parameter set or the SEI message that need to be adapted to generate a parameter set or SEI message specific for the section-specific video stream,
wherein the method comprises:
creating the template and writing it to the gathering information of the formatted video data.

According to another aspect of the present invention, a method for creating video data for deriving a spatially variable section of a scene therefrom is provided, wherein the video data is formatted in a file format and comprises:
a set of one or more source tracks comprising coded video data representing spatial portions of a video showing the scene,
wherein the coded video data is coded using random access points and the formatted video data further comprises one or more random access point alignment indicators for indicating whether or not the random access points in the coded video data for all spatial portions are aligned,
wherein the method comprises:
creating the one or more random access point alignment indicators and writing them to the formatted video data.

According to another aspect of the present invention, an apparatus for creating video data for deriving a spatially variable section of a scene therefrom is provided, wherein the video data is formatted in a file format, wherein the apparatus is adapted to carry out the method disclosed herein.

According to another aspect of the present invention, a method for deriving a spatially variable section of a scene from video data is provided, wherein the video data is formatted in a file format and comprises:
a set of two or more source tracks, each of which comprises coded video data representing a spatial portion of a video showing the scene,
wherein the set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks,
wherein the method comprises:
reading the one or more group indicators, the one or more active source track indicators and the coded video data from the indicated number of two or more active source tracks from the indicated groups from the formatted video data and deriving the spatially variable section of the scene based thereon.

According to another aspect of the present invention, a method for deriving a spatially variable section of a scene from video data, wherein the video data is formatted in a file format and comprises:
a set of two or more source tracks, each of which comprises coded video data representing a spatial portion of a video showing the scene; and
gathering information comprising merge information for merging a sub-set of the set of two or more source tracks in order to generate a section-specific video data stream,
wherein the gathering information further comprises a template for a configurable parameter set and/or SEI message, wherein the template indicates one or more values of the parameter set or the SEI message that need to be adapted to generate a parameter set or SEI message specific for the section-specific video stream,
wherein the method comprises:
reading the template from the gathering information of the formatted video data and adapting the one or more values of the parameter set or the SEI message indicated by the template to generate the parameter set or SEI message specific for the section-specific video stream.

According to another aspect of the present invention, a method for deriving a spatially variable section of a scene from video data is provided, wherein the video data is formatted in a file format and comprises:
a set of one or more source tracks comprising coded video data representing spatial portions of a video showing the scene,
wherein the coded video data is coded using random access points and the formatted video data further comprises one or more random access point alignment indicators for indicating whether or not the random access points in the coded video data for all spatial portions are aligned,
wherein the method comprises:
reading the one or more random access point indicators from the formatted video data and accessing the coded video data based thereon.

According to another aspect of the present invention, an apparatus for deriving a spatially variable section of a scene from video data is provided, wherein the video data is formatted in a file format, wherein the apparatus is adapted to carry out the method of the present disclosure.

According to another aspect of the present invention, a computer program is provided comprising instructions which, when executed by a computer, cause the computer to carry out the method of the present disclosure.

According to another aspect of the present invention, a computer-readable medium is provided comprising instructions which, when executed by a computer, cause the computer to carry out the method of the present disclosure.

According to another aspect of the present invention, a digital storage medium is provided having stored thereon video data according to the present disclosure.

It shall be understood that the video data of the present disclosure have similar and/or identical preferred embodiments, in particular, as defined herein.

It shall be understood that a preferred embodiment of the present invention can also be any combination of the dependent claims or above embodiments with the respective independent claim.

BRIEF DESCRIPTION OF THE DRAWINGS

Embodiments of the present invention are now described in further detail with reference to the accompanying drawings, in which:

FIG. 2 illustrates how a user typically watches only a subset of the tiles constituting the entire 360-degree video when using state-of-the-art head-mounted-displays (HMDs);

FIGS. 5A-5C illustrate related excerpts of the currently envisioned Picture Parameter Set and Slice Header syntax of VVC taken from the VVC specification (Draft 6; Version 11);

FIGS. 6A-6C illustrate an XML schema carried within a box of the file format that is used to provide rules for the creation of the template;

FIG. 9 illustrates the new concept of generated parameter sets, in which the gathering track contains a parameter set template stored out-of-band (inside the sample entry) while that template is used to create the "Generated Parameter Sets" which are allowed to be present in-band when all required media segments are selected by the client.

DETAILED DESCRIPTION OF THE EMBODIMENTS

The description of the embodiments of the present invention brought forward below with respect to the drawings first concentrates on embodiments relating to a basic grouping of source tracks (tracks of tiles) into mergeable sets. Thereafter, embodiments relating to templates for configurable parameter sets and/or SEI messages are described, followed by embodiments relating to an extended grouping for configurable parameter sets and/or SEI messages and random access point indications in track combinations. In particular applications, all four types of embodiments may be used together so as to take advantage of each of these concepts.

Figure 1:
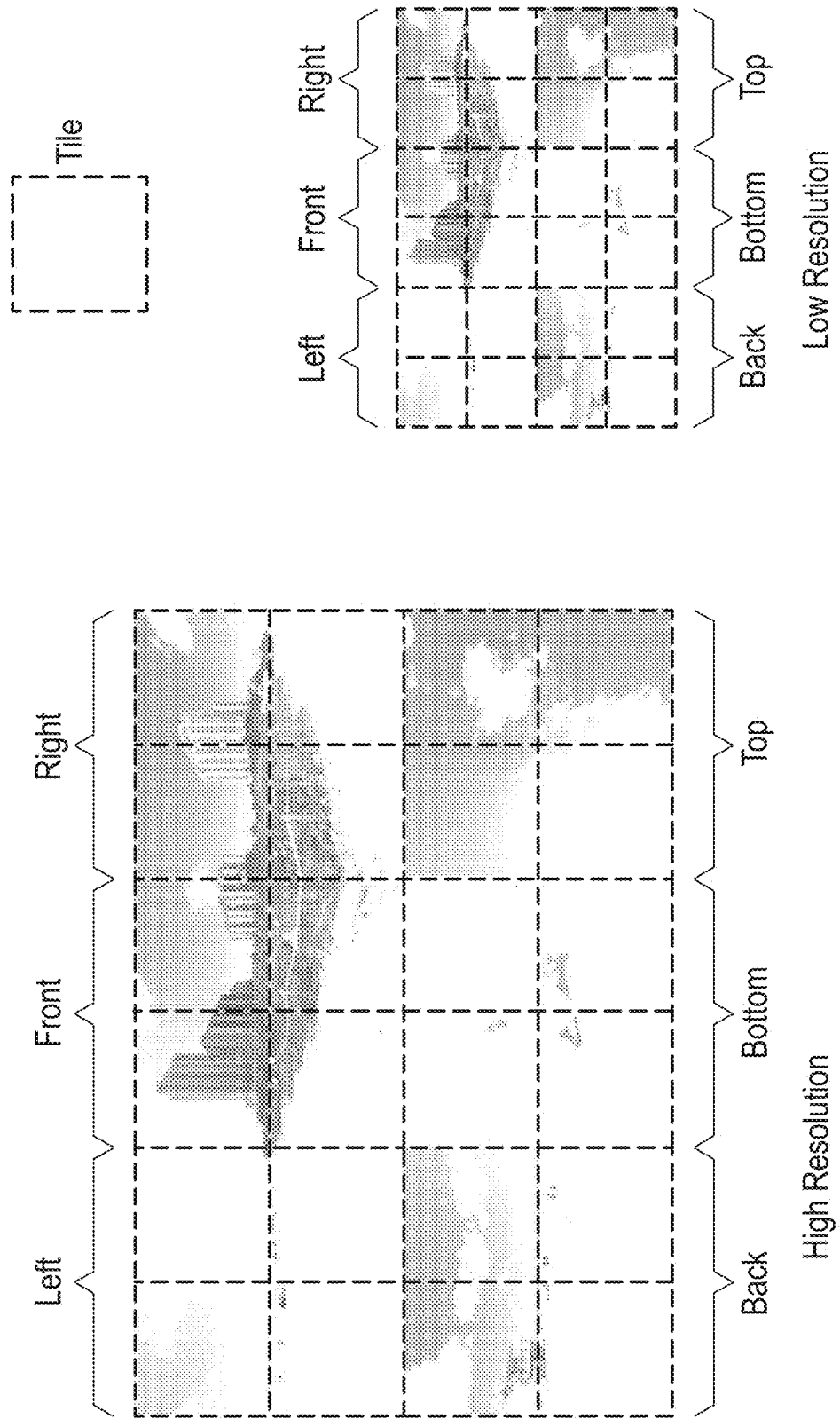
FIG. 1 illustrates a 360-degree video in a cube map projection at two resolutions (high resolution and low resolution) and tiled into 6×4 tiles.
Figure 3:
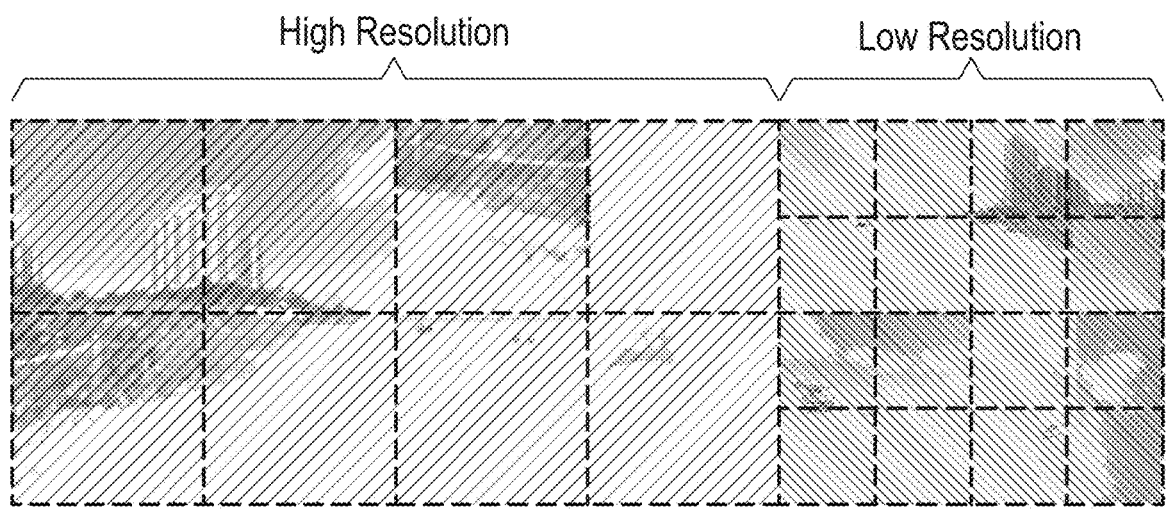
FIG. 3 illustrates a possible tile arrangement in a joint bitstream in the examples of FIGS. 1 and 2.
Figure 4:
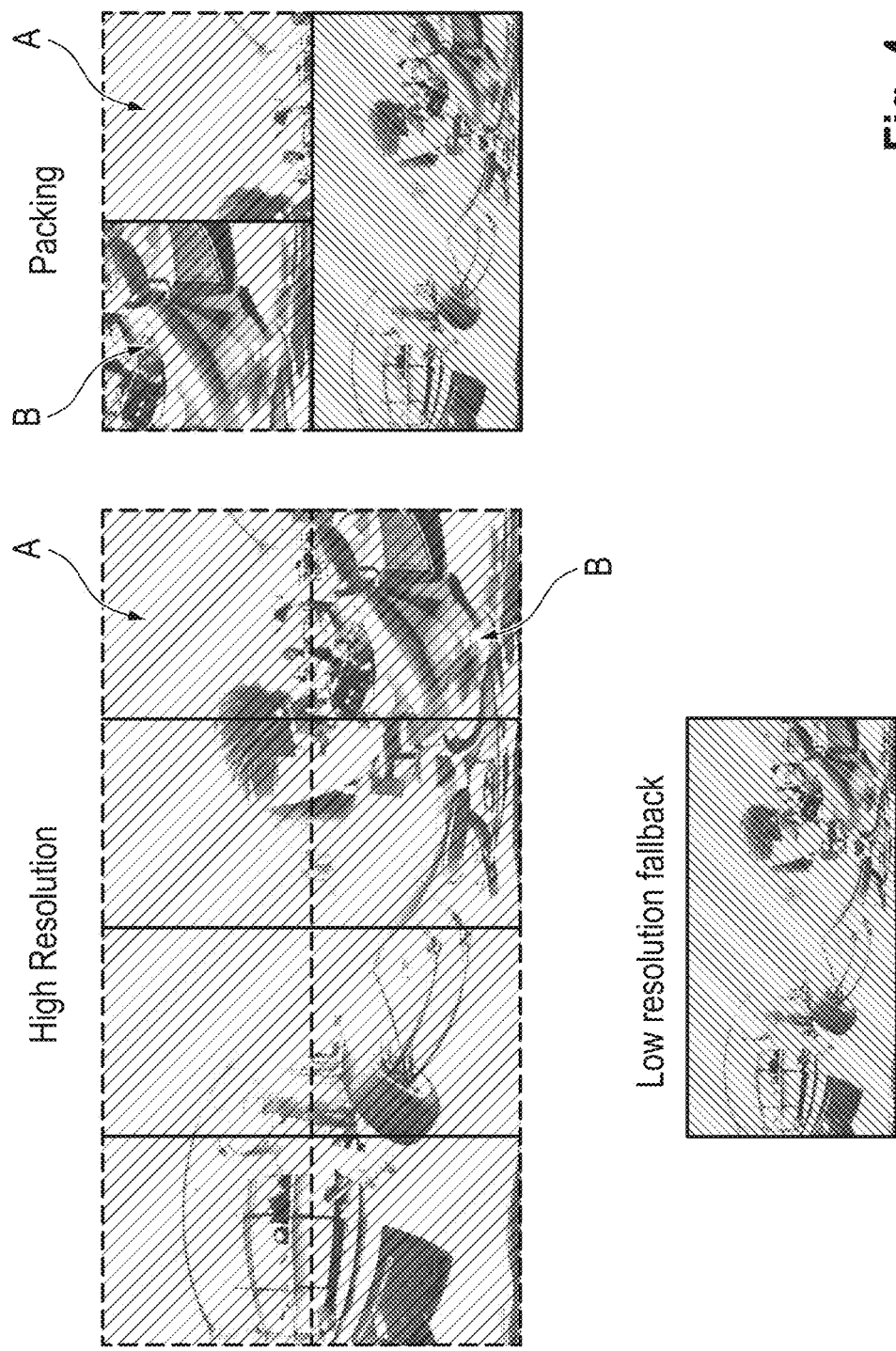
FIG. 4 illustrates an alternative tiling, where the entire low resolution version of the video can be merged with high-resolution tiles covering a subset of the 360-degree video.

In order to motivate and ease the understanding of the embodiments, an example of a 360-degree video playback application based on the cube map projection of a scene illustrated in FIGS. 1 to 3 is described, which is tiled into 6×4 spatial segments in two resolutions (high resolution and low resolution). Such a cube map projection constitutes video data that is arranged for deriving a spatially variable section of the scene therefrom. For example, as illustrated at the top of FIG. 2, a user may use a head-mounted-display (HMD) to watch a field of view (FoV) of 90×90 degrees. In the case of FIG. 2, the subset of tiles that are required for representing the illustrated FoV are the four tiles of the right side, two tiles of the bottom side, one tile of the front side and one side of the back side of the cube map projection. Of course, depending on the viewing direction of the user, other subsets of tiles may be required for representing the user's current FoV. In addition to these tiles, which may be downloaded and decoded by a client application in high resolution, the client application may also need to download the other tiles outside the viewport in order to handle sudden orientation changes of the user. These tiles may be downloaded and decoded by the client application in low resolution. As mentioned above, after download on the client side, it may be desired to merge the downloaded tiles into a single bitstream to be processed by a single decoder, e.g., in order to address the constrains of typical mobile devices with limited computational resources and power.

In the example, it is assumed that each tile is coded with the currently developed VVC (Versatile Video Coding) in a way that it is independently decodable. This can be achieved by partitioning the pictures using a suitable tile/brick/slice structure, so that, e.g., no intra- or inter-prediction is performed between different tiles/bricks of a same or different pictures. As can be seen from FIG. 5, which illustrates excerpts of the currently envisioned Picture Parameter Set and Slice Header syntax of VVC taken from the VVC specification (Draft 6; Version 11), VVC extends the concept of tiles and slices known from HEVC by so-called bricks, which specify a rectangular region of CTU (coding tree unit) rows within a particular tile in a picture. A tile can thus be partitioned into multiple bricks, each consisting of one or more CTU rows within the tile. By means of this extended tile/brick/slice structure, it is easily possible to create a tile arrangement as illustrated in FIG. 3, where 4×2 spatial segments of the high resolution video and 4×4 spatial segments of the low resolution video are merged through compressed-domain processing into a joint bitstream.

According to the present invention, the merging process is supported by a specific 'merging friendly' file format in which the video data is formatted. In this example, the file format is an extension of MPEG OMAF (ISO/IEC 23090-2), which in turn is based on the ISO base media file format (ISO/IEC 14496-12), which defines a general structure for time-based multimedia files such as video and audio. In this file format, the independently decodable video data corresponding to the different spatial segments are comprised in different tracks, which are also referred to as source tracks or tracks of tiles herein.

It shall be noted that although in this example, VVC is assumed as the underlying video codec, the present invention is not limited to the application of VVC and other video codecs, such as HEVC (High Efficiency Video Coding), may be used to realize different aspects of the present invention. Moreover, although in this example the file format is assumed to be an extension of MPEG OMAF, the present invention is not limited to such an extension, and other file formats or extensions of other file formats may be used to realize different aspects of the present invention.

2. Basic Grouping of Source Tracks into Mergeable Sets

According to a first aspect of the present invention, a basic grouping mechanism allows indicating to a file format parser that certain source tracks belong to the same group and that among the tiles belonging to the group a given number is to be played.

In this respect, the formatted video data comprises a set of two or more source tracks, each of which comprises coded video data representing a spatial portion of the video showing the scene. The set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks. In the example, a first group of source tracks comprises the 6×4 high resolution tiles of the cube map projection and a second group of source tracks comprises the 6×4 low resolution tiles. This may be indicated by the one or more group indicators. Moreover, as mentioned above, with the user's assumed FoV of 90×90 degrees, 8 out of the 24 high resolution tiles need to be played to represent the current view of the user, while 16 of the low resolution tiles also need to be transmitted to allow for sudden orientation changes of the user. The 8 source tracks in the first group and the 16 source tracks in the second group may be termed 'active' source tracks and their respective number can be indicated by the one or more active source track indicators.

In one embodiment, this may be realized by using a first box of the file format, for example, a track group type box, in which the one or more group indicators are comprised. A possible syntax and semantics that is based on the concept of the track group box from the ISO base media file format could be as follows:

```
aligned(8) class TrackGroupBox extends Box('trgr') {
}
aligned(8) class TrackGroupTypeBox(unsigned int(32)
track_group_type) extends
FullBox(track_group_type, version = 0, flags = 0)
{
    unsigned int(32) track_group_ID;
    if track_group_type == 'aaaa' {
        unsigned int(32) num_active_tracks;
    }
}
``` track_group_type indicates the grouping type and shall be set to one of the following values, or a value registered, or a value from a derived specification or registration:
[ ... ]
  'aaaa' indicates that this track belongs to a group of tracks with the same value of track_group_ID of which a subset of num_active_tracks tracks is to be played. num_active_tracks must be greater than 1.

In this case, the one or more group indicators are realized by the syntax element track_group_ID and the one or more active source track indicators are realized by the syntax element num_active_tracks. In addition, a new track_group_type is defined ('aaaa' is just an example) that indicates that the track group type box includes the syntax element num_active_tracks. A track group type box of this type could be signalled in each respective source track belonging to a group.

Since the source tracks belonging the first group and the source tracks belonging to the low resolution group are both needed to realize the 360-degree video playback application, the present application further foresees the possibility to indicate to the file format parser that two or more groups of source tracks are bundled together. In this respect, the formatted video data further comprises one or more group bundle indicators for indicating such bundling.

In another embodiment, this may be realized by using, in combination with the above signalling per source track, a separate second box, for example, a track reference type box, to bundle multiple groups together (e.g., using one track_group_ID value for high resolution tiles and one track_group_ID value for low resolution tiles) that are used in one combination.

The value of (flags & 1) shall be equal to 1 in a TrackGroupTypeBox of type 'aaaa' to indicate the uniqueness of track_group_ID so that the group can be referenced via 'tref'.

As implied by the general semantics of a track reference to a track_group_ID, num_active_tracks tracks of an 'aaaa' source track group are used for the 'tref' resolving.

Alternatively, in another embodiment, the source track groups do not indicate the number of tracks to be played, but instead this property is expressed through an extension of a track reference type box as follows:

```
aligned(8) class TrackReferenceBox extends Box('tref') {
    TrackReferenceTypeBox [ ];
}
aligned(8) class TrackReferenceTypeBox (unsigned
int(32) reference_type) extends
Box(reference_type) {
    unsigned int(32) num_track_group_IDs;
    for (i = 0; i < num_track_group_IDs; i++) {
        unsigned int(32) track_group_IDs[i];
        unsigned int(32) num_active_tracks_per_track_group_IDs[i];
    }
}
```

In this case, the one or more group indicators for indicating the source tracks belonging to the respective group of source tracks, the one or more active source track indicators for indicating the number of active source tracks in the group of source tracks and the one or more group bundle indicators for indicating that two or more groups of source tracks are bundled together are comprised in a single box of the file format, in this case, a track reference type box.

The syntax element num_track_group_IDs indicates the number of groups of source tracks that are bundled in the track reference type box and the syntax elements track_group_IDs[i] and num_active_tracks_per_track_group_IDs[i] indicate for each group the track group ID and the number of active tracks. In other words, in this embodiment, each group of source tracks is indicated by a respective group ID (e.g., track_group_ID) and the two or more groups of source tracks that are bundled together are indicated by an indicator for indicating the number of the two or more groups of source tracks that are bundled together (e.g., num_track_group_IDs) and an array of the respective group IDs (e.g., track_group_IDs[i]).

In the latter two embodiments, the formatted video data may further comprise a gathering track comprising merge information for merging a sub-set of the set of two or more source tracks in order to generate a section-specific video data stream, wherein the track reference box is comprised in the gathering track.

Alternatively, in yet another embodiment, a source track signalling is used to bundle together (sub-)groups of source tracks that group together tiles of the same resolution (e.g., high resolution and low resolution). Again, this can be based on the concept of the track group box from the ISO base media file, with a possible syntax and semantics being as follows:

```
aligned(8) class TrackGroupBox extends Box('trgr') {
}
aligned(8) class TrackGroupTypeBox(unsigned int(32)
track_group_type) extends
FullBox(track_group_type, version = 0, flags = 0)
{
    unsigned int(32) track_group_ID;
    if track_group_type == 'bbbb' {
        unsigned int(32) track_subgroup_ID;
        unsigned int(32) num_track_subgroup_IDs;
        for (i = 0; i < num_track_subgroups_IDs; i++)
        {
            unsigned int(32) track_subgroup_IDs[i];
            unsigned int(32) num_active_tracks_per_track_subgroup_IDs[i];
        }
    }
}
``` track_group_type indicates the grouping type and shall be set to one of the following values, or a value registered, or a value from a derived specification or registration:

[ ... ]

'bbbb' indicates that this track belongs to a group of tracks with the same value of track_group_ID and to the subgroup with the same value of track_subgroup_ID of which a subset of num_active_tracks_per_track_subgroup_IDs[i] tracks is to be played where track_subgroup_ID[i] equals track_subgroup_ID.

As can be seen, in this case, each group of source tracks is indicated as being a sub-group of source tracks by a respective sub-group ID (e.g., track_subgroup_ID) and the two or more sub-groups of source tracks that are bundled together are indicated by a common group ID (e.g., track_group_ID), an indicator for indicating the number of the two or more sub-groups of source tracks that are bundled together (e.g., num_track_subgroup_IDs) and an array of the respective sub-group IDs (e.g., track_subgroup_IDs[i]).

Alternatively, in yet another embodiment of the invention, an additional group-specific level signalling allows the client to choose groups/subgroups combinations that match the supported level capabilities of the decoder. For example, an extension of the last embodiment using the track group type box could be as follows:

```
aligned(8) class TrackGroupBox extends Box('trgr') {
}
aligned(8) class TrackGroupTypeBox(unsigned int(32)
track_group_type) extends
FullBox(track_group_type, version = 0, flags = 0)
{
  unsigned int(32) track_group_ID;
  if track_group_type == 'cccc' {
    unsigned int(32) level_idc;
    unsigned int(32) track_subgroup_ID;
    unsigned int(32) num_track_subgroup_IDs;
    for (i = 0; i < num_track_subgroups_IDs; i++)
    {
       unsigned int(32) track_subgroup_IDs[i];
       unsigned int(32) num_active_tracks_per_track_sub-
       group_IDs[i];
    }
  }
}
``` track_group_type indicates the grouping type and shall be set to one of the following values, or a value registered, or a value from a derived specification or registration:

[ ... ]

'cccc' indicates that this track belongs to a group of tracks with the same value of track_group_ID and to a subgroup with the same value of track_subgroup_ID of which a subset of num_active_tracks_per_track_subgroup_IDs[i] tracks is to be played where track_subgroup_ID[i] equals track_subgroup_ID and wherein playback of the group with track_group_ID corresponds to a level of level_idc of a bitstream corresponding to the group, wherein the resulting bitstream entails the indicted number of num_active_tracks_per_track_subgroup_IDs[i] tracks for each of the num_track_subgroups_IDs subgroups.

In other words: The formatted video data, in this case, further comprises a level indicator (e.g., level_idc) for indicating a coding level of a group of source tracks or of a bundle of two or more groups of source tracks when the indicated number of tracks is played jointly.

It shall be noted that the level indicator may also be provided in the other described embodiments. Moreover, it shall be noted that the two or more groups of source tracks must not necessarily differ (only) in resolution, but rather they may—additionally or alternatively—differ in coding fidelity. For example, a first group of source tracks may comprise source tracks comprising coded video data of a first resolution and/or fidelity and a second group of source tracks may comprise source tracks comprising coded video data of a second resolution and/or coding fidelity which is different from the first resolution and/or coding fidelity.

3. Templates for Configurable Parameter Sets and/or SEI Messages

As described above, certain applications require variants of parameter sets or SEI messages depending on the playout context (joint decoding of tiles in a merged bitstream with varying tile location and tile neighbors). Therefore, it is not straightforward or even possible in many cases to have single parameter sets that apply to several combinations.

One embodiment consists of signalling the grouping mechanism, e.g., as described above, and additionally indicate that certain values of parameter sets templates need to be changed. For instance, referring to the example with varying tile selection only, as discussed earlier, the used grouping mode would indicate that the slice_address (HEVC term) or slice_id (current VVC term used in the Picture Parameter Set syntax table illustrated in FIG. 5) needs to be modified. Another grouping mode value would indicate that RWP SEI messages need adjustment or that tiling related syntax elements need to be adjusted as well.

The drawback of such an approach is that for each use-case, where a different syntax element might need to be changed (sometimes slice_id, while for other use-cases a different syntax element, such as tiling parameters, may require replacement), different group types or similar indications need to be signalled. A more flexible and generic approach that allows for changing any syntax element and indicating which syntax element needs to be changed would be more beneficial.

For this purpose, in another embodiment, a representation of the unaffected parameter set values, i.e., a parameter set template, is carried in a box of the file format. A client can use this representation in order to generate a correct parameter set depending on its tile/track selection.

Thus, according to this second aspect of the present invention, the formatted video data comprises a set of two or more source tracks, each of which comprises coded video data representing a spatial portion of a video showing the scene, and gathering information comprising merge information for merging a sub-set of the set of two or more source tracks in order to generate a section-specific video data stream. The gathering information further comprises a template for a configurable parameter set and/or SEI message, wherein the template indicates one or more values of the parameter set or the SEI message that need to be adapted to generate a parameter set or SEI message specific for the section-specific video stream. In certain embodiments, the formatted video data comprises a gathering track comprising the gathering information. Different embodiments of this aspect are explained in the following:

3.1 XML/JSON Templates

In one embodiment, the parameter set template and/or the SEI message template is an XML or JSON description of the coded structure of the parameter set or the SEI message with syntax element names and values and, potentially, their coding. From this XML/JSON description, a client (file format parser) would be able to generate a bitstream representation of a parameter set/SEI message by coding the individual syntax elements in their respective form, concatenating the result and performing emulation prevention. For syntax elements that are required to be adjusted by the file format parser, e.g., the syntax element slice_id or an equivalent information to adjust the position of tiles in the tiling layout, the respective fields are preferably marked in the XML/JSON description as follows:

```
<SliceIDTemplate
    slice_id[0]="$slice_id$"
    index="0"/>
```

In another embodiment, an XML or JSON schema carried within a box of the file format is used to provide rules for the creation of the template. FIG. 6 illustrates one embodiment of such a schema using XML. An advantage of using an XML/JSON schema is that the receiving file format parser can generate conforming parameter sets/SEI message bitstreams without being aware of the underlying codec a priori as long as the syntax element coding options are known (e.g., fixed vs. variable length coding, exponential golomb code, etc.). A further advantage is that a single schema can be defined once and all parameter set templates and/or SEI message templates which are generated can be easily verified using that schema. The XML/JSON description metadata with the corresponding parameter set template is preferably stored in the track box ('trak') of a gathering track which is located in an initialization segment.

3.2 Bitstream Template without Emulation Prevention

In another embodiment, the parameter set templates and/or the SEI message templates are based on the coded bitstream form of the parameter set/SEI message, i.e., the individual syntax element values are coded according to the specification (e.g., fixed vs. variable length coding, exponential golomb code, etc.) and concatenated according to their specified order. However, this form does not include emulation prevention bytes. Hence, before such a parameter set can be used in a video bitstream, emulation prevention needs to be carried out.

In one embodiment, the parameter set template and/or the SEI message template carries indications of gaps where syntax element values, i.e., their coded representation, such as slice_id, are to be inserted.

Thus, in the general sense, the template may comprise concatenated coded syntax elements of the parameter set or the SEI message, wherein values that do not need to be adapted are validly coded in the template and the template further comprises one or more gap indicators for indicating gaps that are to be filled in the template with validly coded values that need to be adapted. Preferably, the one or more gap indicators for indicating the gaps comprise an offset and a size of the gaps in the template.

Figure 7:
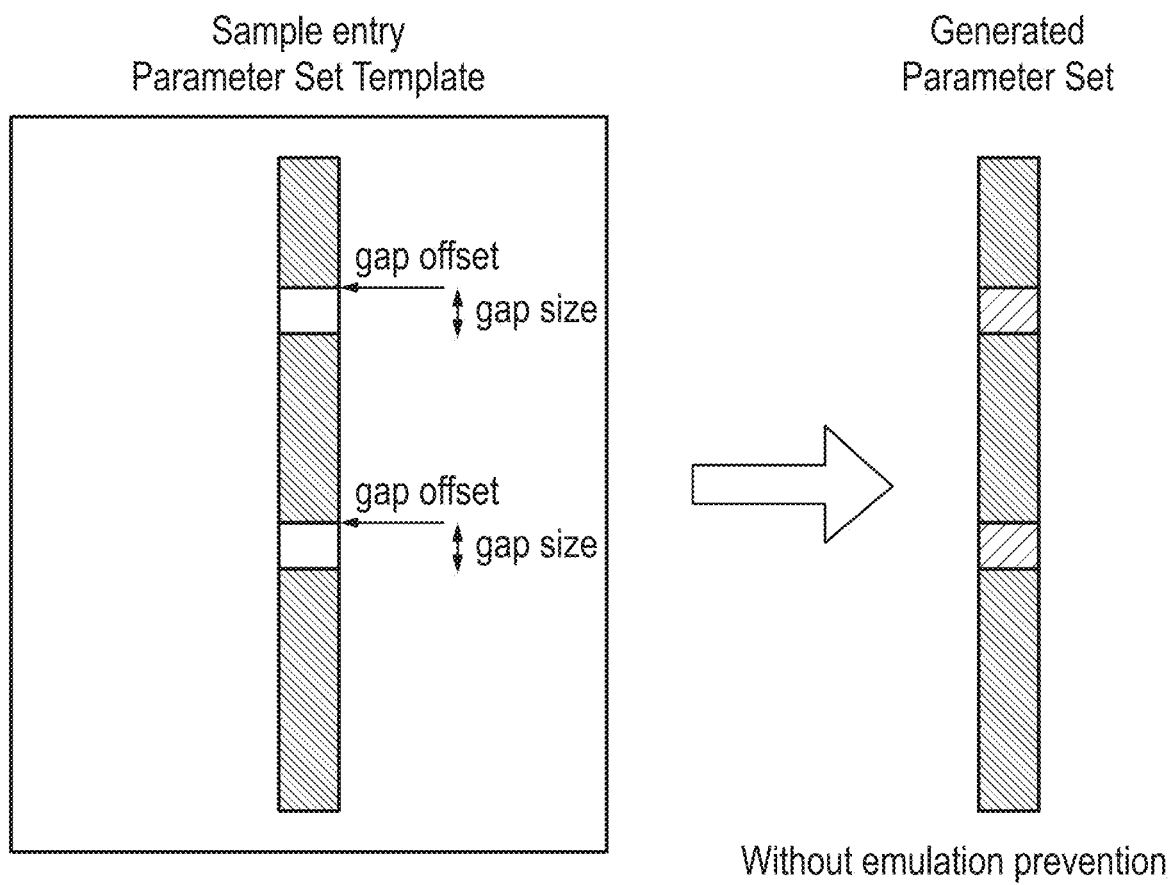
FIG. 7 illustrates the concept of template gaps where a parameter set template is stored within a VVCDecoderConfigurationRecord and the gaps are signalled using corresponding offset and size values.

FIG. 7 illustrates the concept of template gaps where a parameter set template is stored within a VVCDecoderConfigurationRecord and the gaps are signalled using corresponding offset and size values. Gaps can be signalled while defining the bitstream blob position (offset), for example, relative to the start of the VVCDecoderConfigurationRecord, and size of the gap and signalling which element of the parameter set or SEI message is the next one after that blob according to the specification. In one embodiment, slice_id values (see FIG. 5) can be inserted into such template gaps. In another embodiment, tiling structure syntax values (see FIG. 5) are inserted into parameter set template gaps.

Preferably, the generation of the parameter set or the SEI message specific to the section-specific video stream comprises performing an emulation prevention on the concatenated coded syntax elements for generating a coded bitstream of the parameter set or the SEI message after filling the gaps in the template.

3.3 Templates with Placeholder Values

In another embodiment, the parameter set templates and/or the SEI message templates which are stored within a VVCDecoderConfigurationRecord, are fully decodable, i.e., they are stored in bitstream form with emulation prevention like regular non-template parameter sets or SEI messages but the fields to be adjusted are filled with coding-wise valid placeholder values. Such template parameter sets are fully compliant to the specification and can be parsed by a standard compliant VVC parser. The idea of using such parameter set templates and/or SEI message templates is that once the parser has processed those parameter sets/SEI messages, its instance can be used to easily overwrite the required values in order to conclude the definition of the generated parameter sets/SEI messages.

Thus, in the general sense, the template may comprise a coded bitstream of the parameter set or the SEI message including emulation prevention bytes, wherein the one or more values that need to be adapted are filled in the coded bitstream with validly coded placeholder values. It is understood that in this variant of the embodiment described in section 3.2 above, the one or more gap indicators correspond to placeholder value indicators for indicating placeholder values that need to be adapted, wherein the one or more placeholder value indicators for indicating the placeholder values comprise an offset and a size of the placeholder values in the template.

3.4 Possible Realization

The following shows a possible realization of the above embodiments, i.e., a decoder configuration record box within a sample entry with a new sample entry type 'vvcG', where in the loop "for (i=0; i<numNalus; i++)", a NAL unit could comprise, e.g., a bitstream forming a parameter set template or a SEI message template or a XML/JSON base64 coded representation of a parameter set template or SEI message template.

```
aligned(8) class VvcDecoderConfigurationRecord {
    unsigned int(8) configurationVersion = 1;
    unsigned int(7) general_profile_idc;
    unsigned int(1) general_tier_flag;
    unsigned int(24) general_sub_profile_idc;
    unsigned int(8) num_bytes_constraint_info;
    unsigned int(8*num_bytes_constraint_info) general_constraint_info;
    unsigned int(8) general_level_idc;
    bit(6) reserved = '111111'b;
    unsigned int(2) chroma_format_idc;
    bit(5) reserved = '11111'b;
    unsigned int(3) bit_depth_luma_minus8;
    bit(5) reserved = '11111'b;
    unsigned int(3) bit_depth_chroma_minus8;
    unsigned int(16) avgFrameRate;
    unsigned int(2) constantFrameRate;
    unsigned int(3) numTemporalLayers;
    unsigned int(2) lengthSizeMinusOne;
    unsigned int(8) numOfArrays;
    for (j=0; j < numOfArrays; j++) {
        unsigned int(1) array_completeness;
        bit(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

While in this realization, the template is comprised in a decoder configuration record (e.g., VvcDecoderConfigurationRecord), it may also be comprised at another position in the initialization segment, for example, at another position in a sample description box or at another position in a sample entry box. Moreover, the presence of the template in a NAL unit may preferably be indicated by the NAL unit type (e.g., by defining a specific NAL unit type for indicating NAL units comprising templates).

In addition to indicating parameter set templates or SEI message templates in a sample entry of type 'vvcG', the presence of parameter set templates or SEI message templates can preferably be indicated by an additional flag templateNalu in the decoder configuration record in a regular 'vvc1' sample entry. This flag may be provided e.g. for each NAL unit in the loop "for (i=0; i<numNalus; i++)".

Thus, in the general sense, the template may be comprised in a sample entry box, preferably, in a decoder configuration record, wherein the presence of the template in a NAL unit is indicated by the sample entry type (e.g., 'vvcG') and/or by one or more template indicators (e.g., templateNalu) in the sample entry box.

In these embodiments, further NAL unit types such as Supplemental Enhancement Information (SEI) messages can be carried in any of the above template forms and be modified accordingly dependent on the specific combination chosen on the client side. One such SEI message would be the RWP SEI message as specified by AVC and HEVC.

In order to ease the substitution of the parameters/syntax elements in the parameter sets or SEI messages, the required additional information is present through a grouping mechanism partly signalled in the gathering information, for example, a gathering track, and the source tracks selected to be combined. This aspect is discussed further below in section 4.

3.5 Track-Wise Vs Sample-Wise Carriage

The discussed methods for configurable parameter sets and/or SEI messages can either be present in, e.g., the decoder configuration record in the initialization segment, as in the above embodiments, or within a track at certain samples. When the parameter set templates are contained within a track, for instance, as media samples, a new sample format as a parameter set template or a SEI message template could be defined, e.g., in XML/JSON format.

In another embodiment, a NAL unit with a NAL unit type reserved for external use in VVC is used, where the body of the NAL unit (i.e., the NAL unit payload) is filled with some parameters and place-holder values (somehow distinguishable) that need to be changed according to some values in the sample group information or similar. For that purpose, any of the discussed methods (templates in XML/JSON or bitstream format with identified "to-be changed" fields) can be inserted in the NAL unit payload of that special NAL unit structure.

Figure 8:
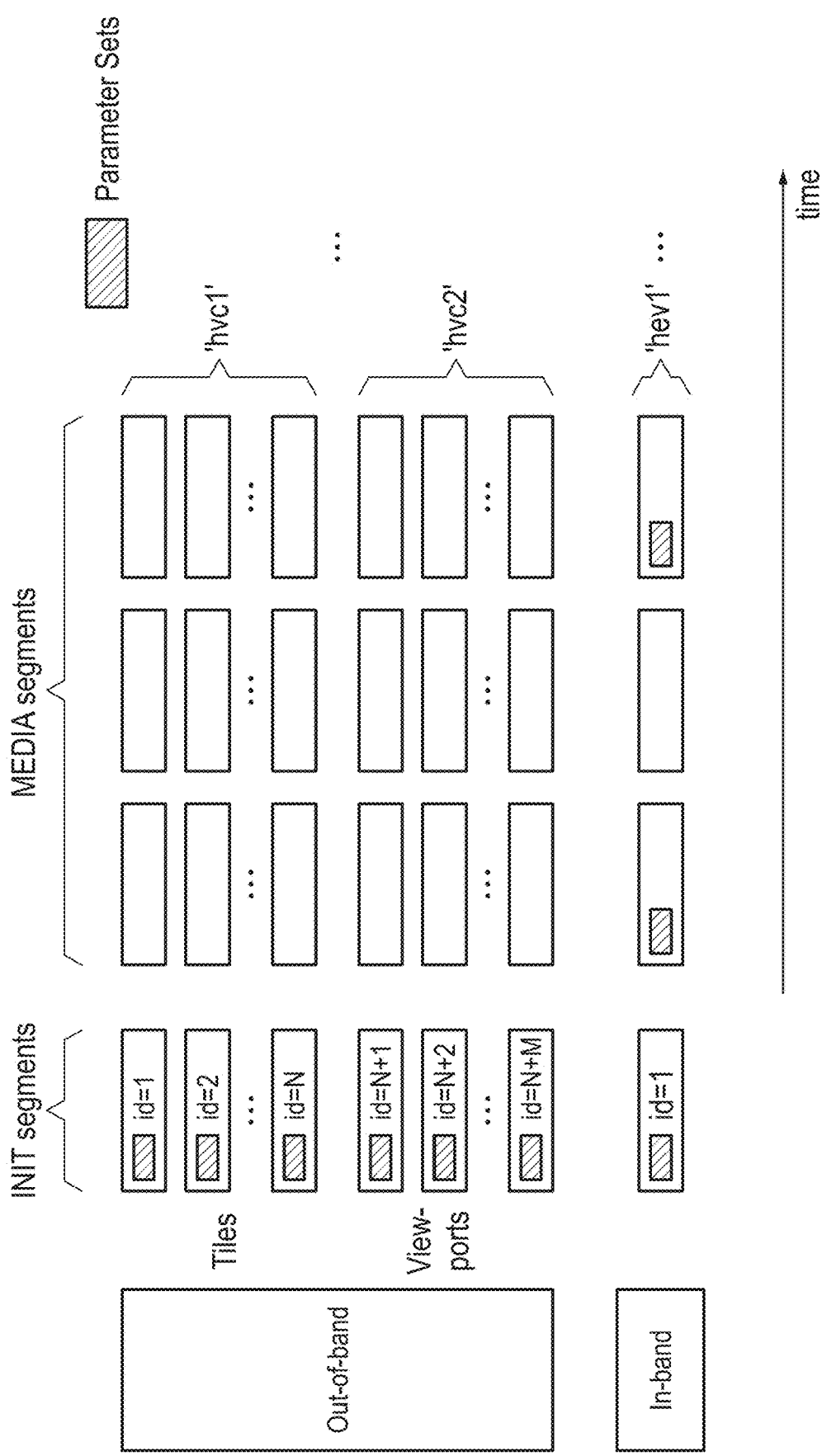
FIG. 8 illustrates two types of decoder configuration processes, namely, using out-of-band parameter sets and in-band parameter sets, which are allowed by the file format specification.

FIG. 8 illustrates two types of decoder configuration processes which are allowed by the file format specification:
  Out-of-band parameter sets, which are contained only in the sample entries inside a corresponding decoder configuration record box inside the initialization segment.
  In-band parameter sets, which are contained in the sample entries but also allowed to be transmitted in the media samples themselves, allowing the configuration of the decoder to change over time while playing the same file format track.

In OMAF Version 1 only out-of-band signaling is allowed for 360-degree video and each extractor track contains pre-defined parameter sets which were generated by the file format packager for a fixed tiling configuration. Therefore, every time the client wants to change that tiling configuration, it has to change the gathering track and re-initialize the decoder with corresponding parameter sets.

As already explained in the previous section, having such pre-defined parameter sets for a specific tiling configuration is a major drawback, since clients can only operate on pre-defined extractor tracks for a particular tiling scheme and cannot flexibly merge required tiles themselves (without extractor NAL units).

Therefore, the idea of the present invention is to combine the concepts of in-band and out-of-band parameter sets and create a solution which includes both concepts. FIG. 9 illustrates the new concept of generated parameter sets. The corresponding gathering track contains a parameter set template stored out-of-band (inside the sample entry) while that template is used to create the "Generated Parameter Sets" which are allowed to be present in-band when all required media segments are selected by the client. The file format track grouping mechanism is used in order to provide the information on how to update the parameter set template based on chosen subset of downloaded tiles.

In one embodiment, the gathering track does not comprise any media segments itself so that its media segments are implicitly defined as a sum of media segments of chosen tiles ('vvcG' in FIG. 9). Hence, the entire metadata which is required for the creation of the generated parameter set is contained in the initialization segment (sample entry, etc.) of the gathering track.

In another embodiment, the gathering track also comprises media segments which provide additional metadata for the generation of parameter sets. This allows to change the behavior of parameter set generation over time while not only relying on metadata from the sample entry.

Thus, in the general sense, the template may be comprised in an initialization segment of the gathering track, preferably, in a sample description box, more preferably, in a sample entry box, most preferably, in a decoder configuration record, and the merge information comprises media segments comprising references to the coded video data of the sub-set of the set of two or more source tracks, wherein one or more of the media segments further comprise: (i) a template for a configurable parameter set and/or SEI message, or (ii) an indicator for indicating that a parameter set and/or SEI message generated with a template shall be included in the media segments of the generated section-specific video data stream.

It shall be noted that with all the embodiments relating to the use of templates for configurable parameter sets and/or SEI messages, the coded video data comprised by each source track may be coded using slices and the generation of the section-specific video data stream does not require adapting values of slice headers of the slices.

Preferably, the coded video data comprised by each source track is coded: (i) using tiles and the values that need to be adapted relate to the tile structure, and/or (ii) using bricks and the values that need to be adapted relate to the brick structure, and/or (iii) using slices and the values that need to be adapted relate to the slice structure. In particular, the values that need to be adapted may describe the position of a tile and/or brick and/or slice in a picture of the video and/or in the coded video data.

The parameter set is preferably a Video Parameter Set, VPS, a Sequence Parameter Set, SPS, or a Picture Parameter Set, PPS, and/or the SEI message is preferably a region-wise-packing, RWP, SEI message.

4. Extended Grouping for Configurable Parameter Sets and/or SEI Messages

As described in the introduction, the current state-of-the-art method for expressing that a group of source tracks can be jointly decoded is by means of the mentioned extractor tracks that carry the appropriate parameter sets and explicitly refer to the respective tracks that form one specific valid combination as indicated in FIG. 2. In order to reduce the overhead of the state-of-the-art solution (one track per viewport), the present invention provides a more flexible indication of which tracks can be combined and the rules for the combination. Therefore, as part of the present invention, the set of two or more source tracks may comprise one or more boxes of the file format, each comprising additional information for describing syntax elements identifying the characteristics of a source track, wherein the additional information enables the generation of the parameter set or the SEI message specific for the section-specific video stream without having to parse the coded video data.

In one embodiment, the additional information describes syntax elements identifying a slice ID or another information used in the slice headers for identifying the slice structure of the associated VCL NAL units to identify the slices in a combined bitstream and their position within the combined picture.

In another embodiment, the additional information describes: (i) syntax elements identifying the width and height of the coded video data comprised by each source track, and/or (ii) syntax elements identifying a projection mapping, a transformation information and/or guard band information related to the generation of a region-wise-packing, RWP, SEI message. For example, the width and height of the coded video data can be identified in units of coded samples or in units of the largest coding blocks. Regarding the RWP SEI message, the syntax elements identifying the projection mapping may comprise the width and height as well as the top and left position of the rectangular region within the projection mapping. Moreover, the syntax elements identifying the transformation information may comprise a rotation and a mirroring.

Further, in another embodiment, the additional information further comprises a coded length and/or coding mode (e.g., u(8), u(v), ue(v)) of the respective syntax elements in order to ease creation of the configurable parameter sets or SEI messages.

In one embodiment, the syntax of the above boxes is as follows. Each initialization segment of each source track contains a 'trgr' box (track grouping indication) inside a 'trak' box (track box) with an extended track group type box, as described above. The new syntax can then be carried in an extension of a track group type box as follows:

```
aligned(8) class ConfigurableParameterSetBox extends Track-
GroupTypeBox('cops'){
  // This box includes the fields necessary to rewrite the parameter
  set
  // template from the sample entry of the gathering track.
  unsigned int(8) grouping_mode;
  if grouping_mode == 0 {
    unsigned int(32) slice_id; // Indicating the slice_id or equivalent
      // information in slice headers of the
      // associated VCL NAL units.
    unsigned int(32) codedLength;
    unsigned int(8) codingMode;
  }
  if grouping_mode == 1 {
    // RWP SEI message parameters.
```

```
    unsigned int(32) top; // Tile projected top pos in samples.
    unsigned int(32) left; // Tile projected left pos in samples.
    unsigned int(32) proj_height; // Tile projected width in samples.
    unsigned int(32) proj_width; // Tile projected height in samples.
    unsigned int(8) transform_type;
    unsigned int(32) guard_band_symmetry; // Guard band
    symmetri-
      // cally.
    unsigned int(32) guard_band_thickness; // Guard band
    thickness in
      // samples.
  }
  if (grouping_mode == 2)
  {
    // Tiling structure related syntax.
    unsigned int(32) width; // Coded tile width in samples.
    unsigned int(32) height; // Coded tile height in samples.
    [...]
  }
}
```

5. Random Access Point Indications in Track Combinations

VVC could have mixed NAL unit types in the same access unit, in which case IDR NAL units could be mixed with non-IDR NAL units, i.e., some regions could be coded using inter-prediction while other regions within the picture could be intra-coded and reset the prediction chain for this particular region. At such samples, a client could change its tile selection in parts of the picture, which is why it is vital to mark these samples, e.g., with a file format signaling mechanism to indicate sub-picture random access points (RAPS) which indicate that even a non-IDR NAL unit has instantaneous decoder refresh (IDR) properties when extracted.

In this aspect of the present invention, different spatial portions of a video showing a scene may also be provided in a single source track. Accordingly, video data for deriving a spatially variable section of a scene therefrom is foreseen, wherein the video data is formatted in a file format and comprises a set of one or more source tracks comprising coded video data representing spatial portions of a video showing the scene. The coded video data is coded using random access points and the formatted video data further comprises one or more random access point alignment indicators for indicating whether or not the random access points in the coded video data for all spatial portions are aligned.

For example, in one embodiment, the different regions of a picture are separated into several source tracks. In a grouping mechanism, it is preferably signaled whether RAPs are aligned or not. This could be done, for instance, by making sure that wherever a RAP is present in a source track there is a RAP within the corresponding access unit of another source track containing another spatial portion of the picture or by having a further track (similar to a master track) that is used to signal the RAPs. In the second case, only a RAP signaled in the "master" track—e.g., a gathering track as described above—indicates a RAP in another source track. If the grouping mechanism indicates RAPs are not aligned all RAP signaling in separate source tracks needs to be parsed. In other words: In this embodiment, the coded video data representing the different spatial portions are comprised in different source tracks and the formatted video data further comprises a common track comprising one or more random access point indicators for indicating the random access points for all source tracks.

In another embodiment, all spatial portions are included into the same source track. Still for some use-cases (e.g., zoom), it might be desirable to extract a part of the whole picture (e.g., a region of interest (RoI) in the middle). In such scenarios, it might happen that RAPs in the whole picture and in the RoI are not necessarily always aligned. For instance, there may be more RAPs present in the RoI than in the whole picture.

In these embodiments, the formatted video data may further comprise one or more partial random access point indicators for indicating that an access unit of the video has a random access point for a spatial portion of the video but not for the whole access unit. Moreover, the formatted video data may further comprise partial random access point information for describing the location and/or shape of the spatial portion having the random access point.

In one realization, this information may be provided using so-called sample groups, which are used in the ISO base media file format to indicate specific characteristics of a picture (e.g., sync sample, RAPs, and so on). In the present invention, sample groups can be used to indicate that an access unit has a partial RAP, i.e., a sub-picture (region-specific) random access point. Further, signaling could be added to indicate that the region can be shown for each picture without any drift and the dimensions of the region could be signaled. The syntax of the existing sample to group box is shown below:

```
aligned(8) class SampleToGroupBox
extends FullBox('sbgp', version, 0) {
    unsigned int(32) grouping_type;
    if (version == 1) {
        unsigned int(32) grouping_type_parameter;
    }
    unsigned int(32) entry_count;
    for (i=1; i <= entry_count; i++) {
        unsigned int(32) sample_count;
        unsigned int(32) group_description_index;
    }
}
```

In this embodiment, a sample group is defined for the SampleToGroupBox with a specific grouping type 'prap' (partial rap).

In addition, a sample group description can be defined e.g. as follows:

```
class PartialRandomAccessPointsInformation extends VisualSampleGroupEntry
('prap') {
    PartiaRandomAccessPointsDescription prai;
}
```

The sample description would then indicate the region dimension that is random-accessible, e.g.:

```
class PartialRandomAccessPointsInformation {
    unsigned int(32) decodable_region_coordinate_x;
    unsigned int(32) decodable_region_coordinate_y;
    unsigned int(32) decodable_region_width;
    unsigned int(32) decodable_region_height;
}
```

In a further embodiment, the different regions are mapped to separate NAL units, which means that only some NAL units of an Access Unit could be decoded. It is a part of the present invention to indicate that a specific NAL unit can be treated as a RAP if only the subset corresponding to that region is decoded for a bitstream. For this purpose, sub-sample grouping information for sub-pic RAPS can be derived, e.g., by using the concept of the existing sub sample information box as follows:

```
aligned(8) class SubSampleInformationBox
    extends FullBox('subs', version, flags) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if(version == 1) {
                    unsigned int(32) subsample_size;
                }
                else {
                    unsigned int(16) subsample_size;
                }
                unsigned int(8) subsample_priority;
                unsigned int(8) discardable;
                unsigned int(32) codec_specific_parameters;
            }
        }
    }
}
```

The codec_specific_parameters could the indicate which sub-sample is the RAP and which not.

6. Further Embodiments

So far, the description of the embodiments of the present invention brought forward below with respect to the drawings has focused on the video data for deriving a spatially variable section of a scene therefrom and the specific file format in which it is formatted. However, the present invention also relates to methods and apparatuses for creating video data for deriving a spatially variable section of a scene therefrom, and methods and apparatuses for deriving a spatially variable section of a scene from video data, wherein the video data is formatted in a specific file format. Moreover, the present invention also relates to corresponding computer programs, computer-readable media and digital storage media.

In more detail, the present invention also relates to the following embodiments:

Method for creating video data for deriving a spatially variable section of a scene therefrom, wherein the video data is formatted in a file format and comprises:
  a set of two or more source tracks, each of which comprises coded video data representing a spatial portion of a video showing the scene,
    wherein the set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks,
wherein the method comprises:
determining the groups of source tracks and the number of two or more active source tracks in a group, creating the one or more group indicators and the one or more active source track indicators and writing them to the formatted video data.

In an embodiment of the method, the formatted video data further comprises one or more group bundle indicators for indicating that two or more groups of source tracks are bundled together, wherein the method comprises:
determining the two or more groups of source tracks that are bundled together, creating the one or more bundle indicators and writing them to the formatted video data.

In an embodiment of the method, the one or more group indicators for indicating the source tracks belonging to the respective group of source tracks and the one or more active source track indicators for indicating the number of active source tracks in the group of source tracks are comprised in a first box of the file format that is separate from a second box of the file format in which the one or more group bundle indicators for indicating that two or more groups of source tracks are bundled together are comprised.

In an embodiment of the method, the first box is a track group type box and the second box is a track reference type box.

In an embodiment of the method, the one or more group indicators for indicating the source tracks belonging to the respective group of source tracks, the one or more active source track indicators for indicating the number of active source tracks in the group of source tracks and the one or more group bundle indicators for indicating that two or more groups of source tracks are bundled together are comprised in a single box of the file format.

In an embodiment of the method, the single box is a track group type box or a track reference type box.

In an embodiment of the method, the track group type box is comprised in a source track and/or wherein the formatted video data further comprises a gathering track comprising merge information for merging a sub-set of the set of two or more source tracks in order to generate a section-specific video data stream, wherein the track reference box is comprised in the gathering track, wherein the method comprises:
determining the sub-set of the set of two or more source tracks, creating the gathering track comprising the merge information and writing it to the formatted video data.

In an embodiment of the method, each group of source tracks is indicated by a respective group ID and the two or more groups of source tracks that are bundled together are indicated by an indicator for indicating the number of the two or more groups of source tracks that are bundled together and an array of the respective group IDs, or wherein each group of source tracks is indicated as being a sub-group of source tracks by a respective sub-group ID and the two or more sub-groups of source tracks that are bundled together are indicated by a common group ID, an indicator for indicating the number of the two or more sub-groups of source tracks that are bundled together and an array of the respective sub-group IDs.

In an embodiment of the method, the formatted video data further comprises a level indicator for indicating a coding level of a group of source tracks or of a bundle of two or more groups of source tracks, wherein the method comprises:
determining the group of source tracks or the bundle of two or more groups of source tracks, creating the level indicator and writing it to the formatted video data.

In an embodiment of the method, a first group of source tracks comprises source tracks comprising coded video data of a first resolution and/or fidelity and a second group of source tracks comprises source tracks comprising coded video data of a second resolution and/or coding fidelity which is different from the first resolution and/or coding fidelity.

Method for creating video data for deriving a spatially variable section of a scene therefrom, wherein the video data is formatted in a file format and comprises:
a set of two or more source tracks, each of which comprises coded video data representing a spatial portion of a video showing the scene; and
gathering information comprising merge information for merging a sub-set of the set of two or more source tracks in order to generate a section-specific video data stream,
wherein the gathering information further comprises a template for a configurable parameter set and/or SEI message, wherein the template indicates one or more values of the parameter set or the SEI message that need to be adapted to generate a parameter set or SEI message specific for the section-specific video stream,
wherein the method comprises:
creating the template and writing it to the gathering information of the formatted video data.

In an embodiment of the method, the formatted video data comprises a gathering track comprising the gathering information.

In an embodiment of the method, the template comprises an XML or JSON description of the coded structure of the parameter set or the SEI message.

In an embodiment of the method, the formatted video data further comprises an XML or JSON schema providing rules for the creation of the template. wherein the method comprises:
creating the XLM or JSON schema and writing it to the formatted video data.

In an embodiment of the method, the template comprises concatenated coded syntax elements of the parameter set or the SEI message, wherein values that do not need to be adapted are validly coded in the template and the template further comprises one or more gap indicators for indicating gaps that are to be filled in the template with validly coded values that need to be adapted.

In an embodiment of the method, the one or more gap indicators for indicating the gaps comprise an offset and a size of the gaps in the template.

In an embodiment of the method, the generation of the parameter set or the SEI message specific to the section-specific video stream comprises performing an emulation prevention on the concatenated coded syntax elements for generating a coded bitstream of the parameter set or the SEI message after filling the gaps in the template.

In an embodiment of the method, the template comprises a coded bitstream of the parameter set or the SEI message including emulation prevention bytes, wherein the one or more values that need to be adapted are filled in the coded bitstream with validly coded placeholder values.

In an embodiment of the method, the template is comprised in an initialization segment of the gathering track, preferably, in a sample description box, more preferably, in a sample entry box, most preferably, in a decoder configuration record.

In an embodiment of the method, the template is comprised in a NAL unit, wherein the presence of the template in the NAL unit is indicated by the NAL unit type.

In an embodiment of the method, the template is comprised in a sample entry box, preferably, in a decoder configuration record, wherein the presence of the template in a NAL unit is indicated by the sample entry type and/or by one or more template indicators in the sample entry box.

In an embodiment of the method, the template is comprised in an initialization segment of the gathering track, preferably, in a sample description box, more preferably, in a sample entry box, most preferably, in a decoder configuration record, and the merge information comprises media segments comprising references to the coded video data of the sub-set of the set of two or more source tracks, wherein one or more of the media segments further comprise: (i) a template for a configurable parameter set and/or SEI message, or (ii) an indicator for indicating that a parameter set and/or SEI message generated with a template shall be included in the media segments of the generated section-specific video data stream.

In an embodiment of the method, the coded video data comprised by each source track is coded using slices and the generation of the section-specific video data stream does not require adapting values of slice headers of the slices.

In an embodiment of the method, the coded video data comprised by each source track is coded: (i) using tiles and the values that need to be adapted relate to the tile structure, and/or (ii) using bricks and the values that need to be adapted relate to the brick structure, and/or (iii) using slices and the values that need to be adapted relate to the slice structure.

In an embodiment of the method, the values that need to be adapted describe the position of a tile and/or brick and/or slice in a picture of the video and/or in the coded video data.

In an embodiment of the method, the parameter set is a Video Parameter Set, VPS, a Sequence Parameter Set, SPS, or a Picture Parameter Set, PPS, and/or the SEI message is a region-wise-packing, RWP, SEI message.

In an embodiment of the method, the set of two or more source tracks comprises one or more boxes of the file format, each comprising additional information for describing syntax elements identifying the characteristics of a source track, wherein the additional information enables the generation of the parameter set or the SEI message specific for the section-specific video stream without having to parse the coded video data.

In an embodiment of the method, the additional information describes: (i) syntax elements identifying the width and height of the coded video data comprised by each source track, and/or (ii) syntax elements identifying a projection mapping, a transformation information and/or guard band information related to the generation of a region-wise-packing, RWP, SEI message.

In an embodiment of the method, the coded video data comprised by each source track is coded using slices and the additional information describes syntax elements identifying a slice ID or another information used in the slice headers for identifying the slice structure.

In an embodiment of the method, the additional information further comprises a coded length and/or coding mode of the respective syntax elements.

In an embodiment of the method, the one or more boxes are an extension of a track group type box.

Method for creating video data for deriving a spatially variable section of a scene therefrom, wherein the video data is formatted in a file format and comprises:

a set of one or more source tracks comprising coded video data representing spatial portions of a video showing the scene, wherein the coded video data is coded using random access points and the formatted video data further comprises one or more random access point alignment indicators for indicating whether or not the random access points in the coded video data for all spatial portions are aligned, wherein the method comprises:

creating the one or more random access point alignment indicators and writing them to the formatted video data.

In an embodiment of the method, the formatted video data further comprises one or more partial random access point indicators for indicating that an access unit of the video has a random access point for a spatial portion of the video but not for the whole access unit, wherein the method comprises:

creating the one or more partial random access point indicators and writing them to the formatted video data.

In an embodiment of the method, the formatted video data further comprises partial random access point information for describing the location and/or shape of the spatial portion having the random access point, wherein the method comprises:

creating the partial random access point information and writing it to the formatted video data.

In an embodiment of the method, different spatial portions of an access unit are comprised in different NAL units and the partial random access point information describes which NAL units are random access points for a respective spatial portion, wherein the partial random access point information is comprised in a box of the file format, preferably, in a sub sample information box.

In an embodiment of the method, the coded video data representing the different spatial portions are comprised in different source tracks and the formatted video data further comprises a common track comprising one or more random access point indicators for indicating the random access points for all source tracks.

Apparatus for creating video data for deriving a spatially variable section of a scene therefrom, wherein the video data is formatted in a file format, wherein the apparatus is adapted to carry out the method of any of the claims or of any of the above embodiments.

Method for deriving a spatially variable section of a scene from video data, wherein the video data is formatted in a file format and comprises:

a set of two or more source tracks, each of which comprises coded video data representing a spatial portion of a video showing the scene, wherein the set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks, wherein the method comprises:

reading the one or more group indicators, the one or more active source track indicators and the coded video data from the indicated number of two or more active source tracks from the indicated groups from the formatted video data and deriving the spatially variable section of the scene based thereon.

In an embodiment of the method, the formatted video data further comprises one or more group bundle indicators for indicating that two or more groups of source tracks are bundled together, wherein the method comprises:
reading the one or more bundle indicators and the two or more groups of source tracks that are bundled together from the formatted video data and deriving the spatially variable section of the scene based thereon.

In an embodiment of the method, the one or more group indicators for indicating the source tracks belonging to the respective group of source tracks and the one or more active source track indicators for indicating the number of active source tracks in the group of source tracks are comprised in a first box of the file format that is separate from a second box of the file format in which the one or more group bundle indicators for indicating that two or more groups of source tracks are bundled together are comprised.

In an embodiment of the method, the first box is a track group type box and the second box is a track reference type box.

In an embodiment of the method, the one or more group indicators for indicating the source tracks belonging to the respective group of source tracks, the one or more active source track indicators for indicating the number of active source tracks in the group of source tracks and the one or more group bundle indicators for indicating that two or more groups of source tracks are bundled together are comprised in a single box of the file format.

In an embodiment of the method, the single box is a track group type box or a track reference type box.

In an embodiment of the method, the track group type box is comprised in a source track and/or wherein the formatted video data further comprises a gathering track comprising merge information for merging a sub-set of the set of two or more source tracks in order to generate a section-specific video data stream, wherein the track reference box is comprised in the gathering track, wherein the method comprises:
reading the merge information and the sub-set of the set of two or more source tracks from the formatted video data and merging the sub-set of the set of two or more source tracks tracks in order to generate a section-specific video data stream based on the merge information.

In an embodiment of the method, each group of source tracks is indicated by a respective group ID and the two or more groups of source tracks that are bundled together are indicated by an indicator for indicating the number of the two or more groups of source tracks that are bundled together and an array of the respective group IDs, or wherein each group of source tracks is indicated as being a sub-group of source tracks by a respective sub-group ID and the two or more sub-groups of source tracks that are bundled together are indicated by a common group ID, an indicator for indicating the number of the two or more sub-groups of source tracks that are bundled together and an array of the respective sub-group IDs.

In an embodiment of the method, the formatted video data further comprises a level indicator for indicating a coding level of a group of source tracks or of a bundle of two or more groups of source tracks, wherein the method comprises:
reading the level indicator and the group of source tracks or the bundle of two or more groups of source tracks from the formatted video data and deriving the spatially variable section of the scene based thereon.

In an embodiment of the method, a first group of source tracks comprises source tracks comprising coded video data of a first resolution and/or fidelity and a second group of source tracks comprises source tracks comprising coded video data of a second resolution and/or coding fidelity which is different from the first resolution and/or coding fidelity.

Method for deriving a spatially variable section of a scene from video data, wherein the video data is formatted in a file format and comprises:
a set of two or more source tracks, each of which comprises coded video data representing a spatial portion of a video showing the scene; and
gathering information comprising merge information for merging a sub-set of the set of two or more source tracks in order to generate a section-specific video data stream,
wherein the gathering information further comprises a template for a configurable parameter set and/or SEI message, wherein the template indicates one or more values of the parameter set or the SEI message that need to be adapted to generate a parameter set or SEI message specific for the section-specific video stream,
wherein the method comprises:
reading the template from the gathering information of the formatted video data and adapting the one or more values of the parameter set or the SEI message indicated by the template to generate the parameter set or SEI message specific for the section-specific video stream.

In an embodiment of the method, the template comprises an XML or JSON description of the coded structure of the parameter set or the SEI message.

In an embodiment of the method, the formatted video data further comprises an XML or JSON schema providing rules for the creation of the template. wherein the method comprises:
reading the XLM or JSON schema and using it in the generating of the parameter set or the SEI message.

In an embodiment of the method, the template comprises concatenated coded syntax elements of the parameter set or the SEI message, wherein values that do not need to be adapted are validly coded in the template and the template further comprises one or more gap indicators for indicating gaps that are to be filled in the template with validly coded values that need to be adapted.

In an embodiment of the method, the one or more gap indicators for indicating the gaps comprise an offset and a size of the gaps in the template.

In an embodiment of the method, the generation of the parameter set or the SEI message specific to the section-specific video stream comprises performing an emulation prevention on the concatenated coded syntax elements for generating a coded bitstream of the parameter set or the SEI message after filling the gaps in the template.

In an embodiment of the method, the template comprises a coded bitstream of the parameter set or the SEI message including emulation prevention bytes, wherein the one or more values that need to be adapted are filled in the coded bitstream with validly coded placeholder values.

In an embodiment of the method, the template is comprised in an initialization segment of the gathering track, preferably, in a sample description box, more preferably, in a sample entry box, most preferably, in a decoder configuration record.

In an embodiment of the method, the template is comprised in a NAL unit, wherein the presence of the template in the NAL unit is indicated by the NAL unit type.

In an embodiment of the method, the template is comprised in a sample entry box, preferably, in a decoder configuration record, wherein the presence of the template in a NAL unit is indicated by the sample entry type and/or by one or more template indicators in the sample entry box.

In an embodiment of the method, the template is comprised in an initialization segment of the gathering track, preferably, in a sample description box, more preferably, in a sample entry box, most preferably, in a decoder configuration record, and the merge information comprises media segments comprising references to the coded video data of the sub-set of the set of two or more source tracks, wherein one or more of the media segments further comprise: (i) a template for a configurable parameter set and/or SEI message, or (ii) an indicator for indicating that a parameter set and/or SEI message generated with a template shall be included in the media segments of the generated section-specific video data stream.

In an embodiment of the method, the coded video data comprised by each source track is coded using slices and the generation of the section-specific video data stream does not require adapting values of slice headers of the slices.

In an embodiment of the method, the coded video data comprised by each source track is coded: (i) using tiles and the values that need to be adapted relate to the tile structure, and/or (ii) using bricks and the values that need to be adapted relate to the brick structure, and/or (iii) using slices and the values that need to be adapted relate to the slice structure.

In an embodiment of the method, the values that need to be adapted describe the position of a tile and/or brick and/or slice in a picture of the video and/or in the coded video data.

In an embodiment of the method, the parameter set is a Video Parameter Set, VPS, a Sequence Parameter Set, SPS, or a Picture Parameter Set, PPS, and/or the SEI message is a region-wise-packing, RWP, SEI message.

In an embodiment of the method, the set of two or more source tracks comprises one or more boxes of the file format, each comprising additional information for describing syntax elements identifying the characteristics of a source track, wherein the additional information enables the generation of the parameter set or the SEI message specific for the section-specific video stream without having to parse the coded video data.

In an embodiment of the method, the additional information describes: (i) syntax elements identifying the width and height of the coded video data comprised by each source track, and/or (ii) syntax elements identifying a projection mapping, a transformation information and/or guard band information related to the generation of a region-wise-packing, RWP, SEI message.

In an embodiment of the method, the coded video data comprised by each source track is coded using slices and the additional information describes syntax elements identifying a slice ID or another information used in the slice headers for identifying the slice structure.

In an embodiment of the method, the additional information further comprises a coded length and/or coding mode of the respective syntax elements.

In an embodiment of the method, the one or more boxes are an extension of a track group type box.

Method for deriving a spatially variable section of a scene from video data, wherein the video data is formatted in a file format and comprises:
a set of one or more source tracks comprising coded video data representing spatial portions of a video showing the scene,
wherein the coded video data is coded using random access points and the formatted video data further comprises one or more random access point alignment indicators for indicating whether or not the random access points in the coded video data for all spatial portions are aligned
wherein the method comprises:
reading the one or more random access point indicators from the formatted video data and accessing the coded video data based thereon.

In an embodiment of the method, the formatted video data further comprises one or more partial random access point indicators for indicating that an access unit of the video has a random access point for a spatial portion of the video but not for the whole access unit, wherein the method comprises:
reading the one or more partial random access point indicators from the formatted video data and accessing the coded video data based thereon.

In an embodiment of the method, the formatted video data further comprises partial random access point information for describing the location and/or shape of the spatial portion having the random access point, wherein the method comprises:
reading the partial random access point information and accessing the coded video data based thereon.

In an embodiment of the method, different spatial portions of an access unit are comprised in different NAL units and the partial random access point information describes which NAL units are random access points for a respective spatial portion, wherein the partial random access point information is comprised in a box of the file format, preferably, in a sub sample information box.

In an embodiment of the method, the coded video data representing the different spatial portions are comprised in different source tracks and the formatted video data further comprises a common track comprising one or more random access point indicators for indicating the random access points for all source tracks.

Apparatus for deriving a spatially variable section of a scene from video data, wherein the video data is formatted in a file format, wherein the apparatus is adapted to carry out the method disclosed herein or of any of the above embodiments.

Computer program comprising instructions which, when executed by a computer, cause the computer to carry out the method of the present disclosure or of any of the above embodiments.

Computer-readable medium comprising instructions which, when executed by a computer, cause the computer to carry out the method of the present disclosure or of any of the above embodiments.

Digital storage medium having stored thereon video data according to the present disclosure.

These methods, apparatuses, computer programs, computer-readable media and digital storage media can have corresponding features as described with respect to the formatted video data.

In general, the methods for creating video data for deriving a spatially variable section of a scene therefrom may comprise steps of creating the different types of indicators, e.g., the one or more group indicators, the one or more active source track indicators, the one or more group bundle indicators, the level indicator, the one or more partial random access point indicators etc., templates, e.g., templates for configurable parameter sets and/or SEI messages, etc., and information, e.g., the additional information describing: (i) syntax elements identifying the width and height of the coded video data comprised by each source track, and/or (ii) syntax elements identifying a projection mapping, a transformation information and/or guard band information related to the generation of a region-wise-packing, RWP, SEI message, the partial random access point information, etc., and of writing them to the formatted video data. In this context, it may be required that certain information, the groups of source tracks and the number of two or more active source tracks in a group, which is signalled in the file format, is determined. As the case may be, this determination may be performed by means of an interface that allows a user to input the required information or it may be derived—partially or completely—from the coded video data (e.g., the RAP information).

Likewise, the method for deriving a spatially variable section of a scene from video data may comprise steps of reading the different types of indicators, templates and information, and performing different tasks using the read data. This may comprise deriving the spatially variable section of the scene based thereon and/or generating the parameter set or SEI message specific for the section-specific video stream, and/or accessing the coded video data based on read RAP information.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM, or a FLASH memory, having electronically readable control signals stored thereon, which cooperate (or are capable of cooperating) with a programmable computer system such that the respective method is performed. Therefore, the digital storage medium may be computer readable.

In some embodiments, a programmable logic device (for example, a field programmable gate array) may be used to perform some or all of the functionalities of the methods described herein.

In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the accompanying patent claims and not by the specific details presented by way of description and explanation of the embodiments herein.

The invention claimed is:

1. A method for creating video data for deriving a spatial subset therefrom, wherein the video data is formatted in a file format and comprises:
  a set of two or more source tracks, each of which comprises coded video data representing a spatial subset of a video-;
  wherein the set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks;
  wherein the formatted video data further comprises one or more group bundle indicators for indicating that two or more groups of source tracks are bundled together;
  wherein the formatted video data further comprises a level indicator for indicating a coding level of a group of source tracks or of a bundle of two or more groups of source tracks when the indicated number of active source tracks is played jointly; and
  wherein the method comprises the steps of:
  determining the groups of source tracks and the number of two or more active source tracks in a group, creating the one or more group indicators and the one or more active source track indicators, and writing them to the formatted video data;
  determining the two or more groups of source tracks that are bundled together, creating the one or more bundle indicators and writing them to the formatted video data; and
  determining the group of source tracks or the bundle of two or more groups of source tracks, creating the level indicator and writing it to the formatted video data.

2. The method according to claim 1, wherein the one or more group indicators for indicating the source tracks belonging to the respective group of source tracks, the one or more active source track indicators for indicating the number of active source tracks in the group of source tracks and the one or more group bundle indicators for indicating that two or more groups of source tracks are bundled together are comprised in a single box of the file format.

3. The method according to claim 1, wherein each group of source tracks is indicated by a respective group ID and the two or more groups of source tracks that are bundled together are indicated by an indicator for indicating the number of the two or more groups of source tracks that are bundled together and an array of the respective group IDs, or wherein each group of source tracks is indicated as being a sub-group of source tracks by a respective sub-group ID and the two or more sub-groups of source tracks that are bundled together are indicated by a common group ID, an indicator for indicating the number of the two or more sub-groups of source tracks that are bundled together and an array of the respective sub-group IDs.

4. An apparatus for creating video data for deriving a spatial subset therefrom, wherein the video data is formatted in a file format, wherein the apparatus is adapted to carry out the method of claim 1.

5. A method for deriving a spatial subset from video data, wherein the video data is formatted in a file format and comprises:
  a set of two or more source tracks, each of which comprises coded video data representing a spatial subset of a video;
  wherein the set of two or more source tracks comprises groups of source tracks and the formatted video data further comprises one or more group indicators for indicating source tracks belonging to a respective group of source tracks and one or more active source track indicators for indicating a number of two or more active source tracks in a group of source tracks;

wherein the formatted video data further comprises one or more group bundle indicators for indicating that two or more groups of source tracks are bundled together; and wherein the formatted video data further comprises a level indicator for indicating a coding level of a group of source tracks or of a bundle of two or more groups of source tracks when the indicated number of active source tracks is played jointly;

wherein the method comprises the steps of:

reading the one or more group indicators, the one or more active source track indicators and the coded video data from the indicated number of two or more active source tracks from the indicated groups from the formatted video data and deriving the spatial subset based thereon;

reading the one or more bundle indicators and the two or more groups of source tracks that are bundled together from the formatted video data, wherein deriving the spatial subset is further based thereon; and reading the level indicator and the group of source tracks or the bundle of two or more groups of source tracks from the formatted video data, wherein the deriving the spatial subset is further based thereon.

6. The method according to claim 5, wherein the one or more group indicators for indicating the source tracks belonging to the respective group of source tracks, the one or more active source track indicators for indicating the number of active source tracks in the group of source tracks and the one or more group bundle indicators for indicating that two or more groups of source tracks are bundled together are comprised in a single box of the file format.

7. The method according to claim 5, wherein each group of source tracks is indicated by a respective group ID and the two or more groups of source tracks that are bundled together are indicated by an indicator for indicating the number of the two or more groups of source tracks that are bundled together and an array of the respective group IDs, or wherein each group of source tracks is indicated as being a sub-group of source tracks by a respective sub-group ID and the two or more sub-groups of source tracks that are bundled together are indicated by a common group ID, an indicator for indicating the number of the two or more sub-groups of source tracks that are bundled together and an array of the respective sub-group IDs.

8. An apparatus for deriving a spatial subset from video data, wherein the video data is formatted in a file format, and wherein the apparatus is adapted to carry out the method of claim 5.

* * * * *